US012686021B2

(12) United States Patent
Ophardt et al.

(10) Patent No.: US 12,686,021 B2
(45) Date of Patent: Jul. 21, 2026

(54) FLUID DISPENSER WITH INDEPENDENTLY MOVEABLE LEVER AND NOZZLE SHIELD

(71) Applicant: OP-Hygiene IP GmbH, Niederbipp (CH)

(72) Inventors: Heiner Ophardt, Arisdorf (CH); Padraig McDonagh, County Sligo (IE)

(73) Assignee: OP-HYGIENE IP GMBH, Niederbipp (CH)

( * ) Notice: Subject to any disclaimer, the term of this patent is extended or adjusted under 35 U.S.C. 154(b) by 203 days.

(21) Appl. No.: 18/644,276

(22) Filed: Apr. 24, 2024

(65) Prior Publication Data

US 2024/0375135 A1 Nov. 14, 2024

Related U.S. Application Data

(60) Provisional application No. 63/500,885, filed on May 8, 2023.

(51) Int. Cl.
*B05B 11/10* (2023.01)
*A47K 5/12* (2006.01)

(52) U.S. Cl.
CPC ........ *B05B 11/1014* (2023.01); *A47K 5/1205* (2013.01)

(58) Field of Classification Search
CPC ............... B05B 11/1014; B05B 11/106; B05B 11/1074; B05B 11/1057; B05B 11/1562; B05B 11/1009; B05B 11/1052; A47K 5/1205; A47K 5/12; A47K 5/1211; A47K 2010/3233
See application file for complete search history.

(56) References Cited

U.S. PATENT DOCUMENTS

| | | | | | |
|---|---|---|---|---|---|
| 4,186,855 | A * | 2/1980 | Edman | B05B 11/1057 222/472 |
| 5,992,698 | A * | 11/1999 | Copeland | A47K 5/12 222/325 |
| 7,748,573 | B2 | 7/2010 | Anhuf et al. | |
| 9,993,119 | B2 * | 6/2018 | Ophardt | A47K 5/1207 |
| 10,098,511 | B2 * | 10/2018 | Ophardt | B05B 11/1014 |

(Continued)

FOREIGN PATENT DOCUMENTS

| | | |
|---|---|---|
| DE | 4008886 | 9/1990 |
| DE | 20214347 | 9/2002 |

(Continued)

OTHER PUBLICATIONS

Hyclick Dispenser product information sheet, Hyclick System, Schulke & Mayr GmbH, III/08.20/A/intern, 2 pages.

*Primary Examiner* — Vishal Pancholi
(74) *Attorney, Agent, or Firm* — Thorpe North & Western, LLP

(57) ABSTRACT

A fluid dispenser housing including a lever, a biasing mechanism, and a pump engagement member. When the lever is at a rest position and the pump engagement member is at a home position, movement of the lever from the rest position to an activated position causes the lever to engage with the pump engagement member, which moves the pump engagement member from the home position to a depressed position. When the lever returns to the rest position from the activated position under the bias of the biasing mechanism, the lever disengages from the pump engagement member.

18 Claims, 17 Drawing Sheets

(56) References Cited

U.S. PATENT DOCUMENTS

| | | | |
|---|---|---|---|
| 10,743,719 | B2 | 8/2020 | Ophardt et al. |
| 2008/0110936 | A1 | 5/2008 | Ophardt |
| 2014/0144934 | A1 | 5/2014 | Ophardt et al. |
| 2016/0288151 | A1 | 10/2016 | Schultz et al. |
| 2018/0360275 | A1 | 12/2018 | Ophardt et al. |
| 2022/0176394 | A1 | 6/2022 | Ophardt et al. |

FOREIGN PATENT DOCUMENTS

| | | |
|---|---|---|
| DE | 102015109681 | 12/2016 |
| DE | 202017105952 | 11/2018 |
| DE | 102019132545 | 6/2021 |
| EP | 3827720 | 6/2021 |
| SE | 538297 | 5/2016 |
| WO | 2008006209 | 1/2008 |

* cited by examiner

FLUID DISPENSER WITH INDEPENDENTLY MOVEABLE LEVER AND NOZZLE SHIELD

RELATED APPLICATION

This application claims priority to the 8 May 2023 filing date of U.S. Provisional Patent Application Ser. No. 63/500,885, which is incorporated herein by reference.

FIELD OF THE INVENTION

This invention relates to hand cleaning fluid dispensers, and more particularly to dispensers with a housing that is mounted to a support structure such as a wall or a post.

BACKGROUND OF THE INVENTION

It is known to mount hand cleaning fluid dispensers to a support structure such as a wall or a post. This allows the fluid dispensers to be mounted at a suitable height for delivering hand cleaning fluid onto a person's hand, and also allows the dispensers to be mounted at convenient and accessible locations, such as on a wall above or adjacent to a sink; on a wall adjacent to a doorway; or on a support post in a hallway or waiting room.

Wall or post mounted fluid dispensers often have a dispenser housing that is configured to removably receive a fluid reservoir containing a supply of the fluid to be dispensed, and a fluid pump for dispensing the fluid from the reservoir. The dispenser housing typically remains mounted in place on the wall or post, with the fluid reservoir and the fluid pump being removable for replacement when necessary, such as when the supply of fluid in the reservoir is depleted.

It is also known to provide stand-alone hand cleaning fluid dispensers that can be placed on a horizontal support surface, such as a table top, rather than being mounted to a wall or post. Stand-alone or table top fluid dispensers typically consist of a bottle that can be placed directly on top of a horizontal support surface, without any housing, and have a pump mechanism that extends through a top opening of the bottle. Fluid is typically dispensed from a table top dispenser by manually depressing a top portion of the pump mechanism, such as with a user's hand.

Table top dispensers have the advantage that they are easily movable, can be introduced to existing environments without the need to mount a housing, and can be placed on a variety of different support surfaces that may already be present in a given environment, such as tables, desks, and countertops.

In a facility that uses a variety of different fluid dispenser types, including both mounted dispensers and table top dispensers, there may occur a situation in which the facility experiences an oversupply of one type of dispenser and an undersupply of another type of dispenser. For example, a facility may have a large supply of table top dispensers and an undersupply of the fluid reservoirs and pumps needed for its mounted dispenser housings. The applicant has appreciated that it is advantageous to be able to use the table top dispensers in the mounted dispenser housings, as this allows for greater flexibility in how the table top dispensers and the mounted dispensers are used. For example, using the table top dispensers in the mounted dispenser housings allows the mounted dispenser housings to remain operational for dispensing hand cleaning fluid, even if the supply of fluid reservoirs and pumps designed for the mounted dispenser housings has run out.

In the applicant's United States Patent Application Publication No. US 2022/0176394 to Ophardt et al., published Jun. 9, 2022 and incorporated herein by reference, a fluid dispenser housing is described that is able to dispense fluid from both standard mountable fluid dispensers as well as table top fluid dispensers. In some embodiments of the invention described in US 2022/0176394, the fluid dispenser housing has a lever that is moveable between a rest position and a depressed position for activating both the mountable fluid dispensers and the table top fluid dispensers, and a biasing mechanism that biases the lever towards the rest position.

The applicant has now identified a disadvantage of some embodiments of the invention described in US 2022/0176394. In particular, in some embodiments, the biasing mechanism may move the lever from the depressed position back to the rest position at a rapid speed that exceeds the recharge speed of the table top fluid dispenser. In some embodiments, this may cause the table top dispenser to disengage from and/or fall out of the housing.

SUMMARY OF THE INVENTION

To at least partially overcome some of the disadvantages of previously known systems, devices and methods, in one aspect the present invention provides a fluid dispenser housing having a lever that is moveable between a rest position and an activated position, a biasing mechanism that biases the lever towards the rest position, and a pump engagement member that is moveable between a home position and a depressed position. When the lever is at the rest position and the pump engagement member is at the home position, movement of the lever from the rest position to the activated position causes the lever to engage with the pump engagement member, which moves the pump engagement member from the home position to the depressed position. When the lever returns to the rest position from the activated position under the bias of the biasing mechanism, the lever disengages from the pump engagement member.

The applicant has appreciated that a fluid dispenser housing in accordance with the present invention can, for example, be used to activate a table top fluid dispenser, with the pump engagement member activating the table top fluid dispenser when the pump engagement member moves from the home position to the depressed position. Having the lever disengage from the pump engagement member when the lever returns to the rest position prevents the pump engagement member from returning to the home position at a speed that exceeds the recharge speed of the table top fluid dispenser. This advantageously allows the pump engagement member to remain in engagement with the table top fluid dispenser when the lever is released, which helps to prevent the table top fluid dispenser from falling out of the housing.

Table top fluid dispensers typically include an internal pump biasing member, such as a spring, which returns the pump head or actuation member of the table top fluid dispenser to an extended position after the table top fluid dispenser has been activated. The applicant has appreciated that the internal pump biasing member of a table top fluid dispenser can be used to return the pump engagement member to the home position, via the engagement between the pump engagement member and the actuation member of the table top fluid dispenser.

Preferably, the fluid dispenser housing in accordance with the invention is also able to receive and activate standard mountable fluid dispensers. The fluid dispenser housing may, for example, include a catch mechanism that is mechanically connected to the lever, and which engages with a piston head of a standard mountable fluid dispenser. The catch mechanism can be used to activate the mountable fluid dispenser by moving the piston head between a first extended position and a second retracted position when the lever is moved between the rest position and the activated position.

Preferably, the pump engagement member has a piston engagement surface that is configured to engage with the piston head of the mountable fluid dispenser when the piston head moves from the second retracted position to the first extended position. The engagement between the piston engagement surface and the piston head can advantageously be used to return the pump engagement member from the depressed position to the home position.

Further aspects of the invention include the following:

1. A fluid dispenser housing comprising: a lever that is moveable between a rest position and an activated position; a biasing mechanism that biases the lever towards the rest position; and a pump engagement member that is moveable between a home position and a depressed position; wherein the lever and the pump engagement member are configured to have a one-way engagement connection; and wherein the one-way engagement connection is configured so that: when the lever is at the rest position and the pump engagement member is at the home position, movement of the lever from the rest position to the activated position applies an activation force to the pump engagement member via the one-way engagement connection, which moves the pump engagement member from the home position to the depressed position; and when the lever returns from the activated position to the rest position under the bias of the biasing mechanism, no force is applied to the pump engagement member via the one-way engagement connection.

2. A fluid dispenser housing, which optionally includes one or more features of any one or more of the previous aspects, further comprising a support member; wherein the fluid dispenser housing is configured to receive a table top fluid dispenser; wherein, when the table top fluid dispenser is received by the fluid dispenser housing, the support member supports a bottom surface of the table top fluid dispenser, and the pump engagement member engages with an actuation member of the table top fluid dispenser; wherein, when the table top fluid dispenser is received by the fluid dispenser housing and the pump engagement member moves from the home position to the depressed position, the pump engagement member moves the actuation member from an extended position to a retracted position; and wherein, when the table top fluid dispenser is received by the fluid dispenser housing, the pump engagement member is at the depressed position, and the actuation member is at the retracted position, movement of the actuation member from the retracted position to the extended position moves the pump engagement member from the depressed position towards the home position.

3. A fluid dispenser housing, which optionally includes one or more features of any one or more of the previous aspects, further comprising a catch mechanism that is mechanically connected to the lever; wherein the catch mechanism moves from a raised position to a lowered position on movement of the lever from the rest position to the activated position, and moves from the lowered position to the raised position on movement of the lever from the activated position to the rest position; wherein the fluid dispenser housing is configured to receive a mountable fluid dispenser having a piston head with a catch member; wherein the catch mechanism is configured to engage with the catch member when the mountable fluid dispenser is received by the fluid dispenser housing; and wherein, when the catch mechanism is engaged with the catch member, movement of the catch mechanism from the raised position to the lowered position moves the piston head from a first position to a second position, and movement of the catch mechanism from the lowered position to the raised position moves the piston head from the second position to the first position.

4. A fluid dispenser housing, which optionally includes one or more features of any one or more of the previous aspects, wherein the pump engagement member has a piston engagement surface; wherein, when the pump engagement member is at the depressed position, the mountable fluid dispenser is received by the fluid dispenser housing, and the piston head is at the second position, movement of the piston head from the second position to the first position causes the piston head to engage with the piston engagement surface, which moves the pump engagement member from the depressed position towards the home position.

5. A fluid dispenser housing, which optionally includes one or more features of any one or more of the previous aspects, wherein the piston engagement surface is configured to engage with an elongated nozzle of the piston head.

6. A fluid dispenser housing, which optionally includes one or more features of any one or more of the previous aspects, wherein the piston engagement surface comprises a rib.

7. A fluid dispenser housing, which optionally includes one or more features of any one or more of the previous aspects, wherein the pump engagement member comprises a nozzle shield.

8. A fluid dispenser housing, which optionally includes one or more features of any one or more of the previous aspects, wherein the movement of the lever between the rest position and the activated position comprises a pivoting movement of the lever about a lever pivot axis; and wherein the movement of the pump engagement member between the home position and the depressed position comprises a pivoting movement of the pump engagement member about a member pivot axis.

9. A fluid dispenser housing, which optionally includes one or more features of any one or more of the previous aspects, wherein the lever pivot axis is spaced from the member pivot axis.

10. A fluid dispenser housing, which optionally includes one or more features of any one or more of the previous aspects, wherein the lever pivot axis is parallel to the member pivot axis.

11. A fluid dispenser housing, which optionally includes one or more features of any one or more of the previous aspects, wherein the lever pivot axis is above the member pivot axis.

12. A fluid dispenser housing, which optionally includes one or more features of any one or more of the previous aspects, further comprising an axle member that extends along the member pivot axis; wherein the pump engagement member comprises a hook member that removably engages with the axle member; and wherein, when the pump engagement member moves between the home position and the depressed position, the hook member pivots about the axle member.

13. A fluid dispenser housing, which optionally includes one or more features of any one or more of the previous aspects, further comprising a housing chassis; wherein the axle member is moveable relative to the housing chassis between a forward position and a rear position.

14. A fluid dispenser housing, which optionally includes one or more features of any one or more of the previous aspects, further comprising a biasing member that biases the axle member towards the rear position.

15. A fluid dispenser housing, which optionally includes one or more features of any one or more of the previous aspects, wherein the housing chassis comprises a cam surface and the pump engagement member comprises a camming surface; wherein, when the pump engagement member is at the home position, the cam surface engages with the camming surface and the axle member is at the rear position; wherein, when the pump engagement member moves from the home position towards the depressed position, the engagement of the cam surface with the camming surface forces the hook member to move forwardly relative to the housing chassis, which moves the axle member forwardly towards the forward position against the bias of the biasing member; and wherein, when the pump engagement member moves from the depressed position towards the home position, the biasing member moves the axle member rearwardly towards the rear position, and the engagement of the cam surface with the camming surface guides the pump engagement member towards the home position.

16. A fluid dispenser housing, which optionally includes one or more features of any one or more of the previous aspects, wherein, when the pump engagement member is at the home position, the engagement of the cam surface with the camming surface under the bias of the biasing member prevents a force of gravity acting on the pump engagement member from moving the pump engagement member from the home position to the depressed position.

17. A fluid dispenser housing, which optionally includes one or more features of any one or more of the previous aspects, wherein the housing chassis comprises a foot member; wherein the pump engagement member comprises a guide surface; wherein, when the pump engagement member is moved from the depressed position towards the home position, the guide surface moves upwardly into engagement with the foot member; and wherein the engagement between the foot member and the guide surface guides the pump engagement member towards the home position.

18. A fluid dispenser housing, which optionally includes one or more features of any one or more of the previous aspects, wherein the guide surface is angled so as to face upwardly and forwardly.

19. A fluid dispenser housing, which optionally includes one or more features of any one or more of the previous aspects, comprising: a lever that is moveable between a rest position and an activated position; and a nozzle shield that is moveable between a home position and a depressed position; wherein the movement of the lever between the rest position and the activated position comprises a pivoting movement of the lever about a lever pivot axis; wherein the movement of the nozzle shield between the home position and the depressed position comprises a pivoting movement of the nozzle shield about a nozzle shield pivot axis; wherein the lever pivot axis is spaced from the nozzle shield pivot axis; and wherein, when the lever is at the rest position and the nozzle shield is at the home position, movement of the lever from the rest position to the activated position causes the lever to engage with the nozzle shield, which moves the nozzle shield from the home position to the depressed position.

20. A fluid dispenser housing, which optionally includes one or more features of any one or more of the previous aspects, further comprising a biasing mechanism that biases the lever towards the rest position.

21. A fluid dispenser housing, which optionally includes one or more features of any one or more of the previous aspects, wherein the fluid dispenser housing is configured to receive a table top fluid dispenser; wherein the nozzle shield comprises a pump engagement member that engages with an actuation member of the table top fluid dispenser when the table top fluid dispenser is received by the fluid dispenser housing; and wherein, when the table top fluid dispenser is received by the fluid dispenser housing and the nozzle shield moves from the home position to the depressed position, the pump engagement member moves the actuation member from an extended position to a retracted position.

22. A fluid dispenser housing, which optionally includes one or more features of any one or more of the previous aspects, further comprising a catch mechanism that is mechanically connected to the lever; wherein the catch mechanism moves from a raised position to a lowered position on movement of the lever from the rest position to the activated position, and moves from the lowered position to the raised position on movement of the lever from the activated position to the rest position; wherein the fluid dispenser housing is configured to receive a mountable fluid dispenser having a piston head with a catch member; wherein the catch mechanism is configured to engage with the catch member when the mountable fluid dispenser is received by the fluid dispenser housing; and wherein, when the catch mechanism is engaged with the catch member, movement of the catch mechanism from the raised position to the lowered position moves the piston head from a first position to a second position, and movement of the catch mechanism from the lowered position to the raised position moves the piston head from the second position to the first position.

23. A fluid dispenser housing, which optionally includes one or more features of any one or more of the previous aspects, wherein the nozzle shield has a piston engagement surface; wherein, when the nozzle shield is at the depressed position, the mountable fluid dispenser is received by the fluid dispenser housing, and the piston head is at the second position, movement of the piston head from the second position to the first position causes the piston head to engage with the piston engagement surface, which moves the nozzle shield from the depressed position towards the home position.

24. A fluid dispenser housing, which optionally includes one or more features of any one or more of the previous aspects, wherein the piston engagement surface is configured to engage with an elongated nozzle of the piston head.

25. A fluid dispenser housing, which optionally includes one or more features of any one or more of the previous aspects, wherein the piston engagement surface comprises a rib.

26. A fluid dispenser housing, which optionally includes one or more features of any one or more of the previous aspects, wherein the lever pivot axis is parallel to the nozzle shield pivot axis.

27. A fluid dispenser housing, which optionally includes one or more features of any one or more of the previous aspects, wherein the lever pivot axis is above the nozzle shield pivot axis.

28. A fluid dispenser housing, which optionally includes one or more features of any one or more of the previous aspects, further comprising an axle member that extends along the nozzle shield pivot axis; wherein the nozzle shield comprises a hook member that removably engages with the axle member; and wherein, when the nozzle shield moves between the home position and the depressed position, the hook member pivots about the axle member.

29. A fluid dispenser housing, which optionally includes one or more features of any one or more of the previous aspects, further comprising a housing chassis; wherein the axle member is moveable relative to the housing chassis between a forward position and a rear position.

30. A fluid dispenser housing, which optionally includes one or more features of any one or more of the previous aspects, further comprising a biasing member that biases the axle member towards the rear position.

31. A fluid dispenser housing, which optionally includes one or more features of any one or more of the previous aspects, wherein the housing chassis comprises a cam surface and the nozzle shield comprises a camming surface; wherein, when the nozzle shield is at the home position, the cam surface engages with the camming surface and the axle member is at the rear position; wherein, when the nozzle shield moves from the home position towards the depressed position, the engagement of the cam surface with the camming surface forces the hook member to move forwardly relative to the housing chassis, which moves the axle member forwardly towards the forward position against the bias of the biasing member; and wherein, when the nozzle shield moves from the depressed position towards the home position, the biasing member moves the axle member rearwardly towards the rear position, and the engagement of the cam surface with the camming surface guides the nozzle shield towards the home position.

32. A fluid dispenser housing, which optionally includes one or more features of any one or more of the previous aspects, wherein, when the nozzle shield is at the home position, the engagement of the cam surface with the camming surface under the bias of the biasing member prevents a force of gravity acting on the nozzle shield from moving the nozzle shield from the home position to the depressed position.

33. A fluid dispenser housing, which optionally includes one or more features of any one or more of the previous aspects, wherein the housing chassis comprises a foot member; wherein the nozzle shield comprises a guide surface; wherein, when the nozzle shield is moved from the depressed position towards the home position, the guide surface moves upwardly into engagement with the foot member; and wherein the engagement between the foot member and the guide surface guides the nozzle shield towards the home position.

34. A fluid dispenser housing, which optionally includes one or more features of any one or more of the previous aspects, wherein the guide surface is angled so as to face upwardly and forwardly.

35. A fluid dispenser, which optionally includes one or more features of any one or more of the previous aspects, comprising: a lever that is moveable between a rest position and an activated position; a biasing mechanism that biases the lever towards the rest position; a pump engagement member that is moveable between a home position and a depressed position; a fluid reservoir containing a supply of a fluid; a pump mechanism having an actuator member that is movable relative to the fluid reservoir from an extended position to a retracted position to dispense the fluid from the fluid reservoir; and a pump biasing member that biases the actuator member towards the extended position; wherein, when the lever is at the rest position and the pump engagement member is at the home position, movement of the lever from the rest position to the activated position causes the lever to engage with the pump engagement member, which moves the pump engagement member from the home position to the depressed position; wherein, when the lever returns to the rest position from the activated position under the bias of the biasing mechanism, the lever disengages from the pump engagement member; wherein the pump engagement member engages with the actuation member; wherein, when the pump engagement member moves from the home position to the depressed position, the pump engagement member moves the actuation member from the extended position to the retracted position; and wherein, when the pump engagement member is at the depressed position and the actuation member is at the retracted position, movement of the actuation member from the retracted position to the extended position under the bias of the pump biasing member moves the pump engagement member from the depressed position towards the home position.

36. A fluid dispenser, which optionally includes one or more features of any one or more of the previous aspects, wherein the fluid dispenser comprises the fluid dispenser housing in accordance with any one or more of the previous aspects.

37. A fluid dispenser, which optionally includes one or more features of any one or more of the previous aspects, comprising: a lever that is moveable between a rest position and an activated position; a biasing mechanism that biases the lever towards the rest position; a nozzle shield that is moveable between a home position and a depressed position; a fluid reservoir containing a supply of a fluid; a pump mechanism having a piston head that is movable relative to the fluid reservoir between a first position and a second position to dispense the fluid from the fluid reservoir; and a catch mechanism that is mechanically connected to the lever; wherein, when the lever is at the rest position and the nozzle shield is at the home position, movement of the lever from the rest position to the activated position causes the lever to engage with the nozzle shield, which moves the nozzle shield from the home position to the depressed position; wherein, when the lever returns to the rest position from the activated position under the bias of the biasing mechanism, the lever disengages from the nozzle shield; wherein the catch mechanism moves from a raised position to a lowered position on movement of the lever from the rest position to the activated position, and moves from the lowered position to the raised position on movement of the lever from the activated position to the rest position; wherein the piston head has a catch member; wherein the catch mechanism is configured to engage with the catch member; and wherein, when the catch mechanism is engaged with the catch member, movement of the catch mechanism from the raised position to the lowered position moves the piston head from the first position to the second position, and movement of the catch mechanism from the lowered position to the raised position moves the piston head from the second position to the first position.

38. A fluid dispenser, which optionally includes one or more features of any one or more of the previous aspects, wherein the fluid dispenser comprises the fluid dispenser housing in accordance with any one or more of the previous aspects.

39. A fluid dispenser, which optionally includes one or more features of any one or more of the previous aspects, comprising: a lever that is moveable between a rest position and an activated position; a nozzle shield that is moveable between a home position and a depressed position; a fluid reservoir containing a supply of a fluid; and a pump mechanism having an actuator member that is movable relative to the fluid reservoir from an extended position to a retracted position to dispense the fluid from the fluid reservoir; wherein the movement of the lever between the rest position and the activated position comprises a pivoting movement of the lever about a lever pivot axis; wherein the movement of the nozzle shield between the home position and the depressed position comprises a pivoting movement of the nozzle shield about a nozzle shield pivot axis; wherein the lever pivot axis is spaced from the nozzle shield pivot axis; wherein, when the lever is at the rest position and the nozzle shield is at the home position, movement of the lever from the rest position to the activated position causes the lever to engage with the nozzle shield, which moves the nozzle shield from the home position to the depressed position; wherein the nozzle shield comprises a pump engagement member that engages with the actuation member; and wherein, when the nozzle shield moves from the home position to the depressed position, the pump engagement member moves the actuation member from the extended position to the retracted position.

40. A fluid dispenser, which optionally includes one or more features of any one or more of the previous aspects, wherein the fluid dispenser comprises the fluid dispenser housing in accordance with any one or more of the previous aspects.

41. A fluid dispenser, which optionally includes one or more features of any one or more of the previous aspects, comprising: a lever that is moveable between a rest position and an activated position; a nozzle shield that is moveable between a home position and a depressed position; a fluid reservoir containing a supply of a fluid; a pump mechanism having a piston head that is movable relative to the fluid reservoir between a first position and a second position to dispense the fluid from the fluid reservoir; and a catch mechanism that is mechanically connected to the lever; wherein the movement of the lever between the rest position and the activated position comprises a pivoting movement of the lever about a lever pivot axis; wherein the movement of the nozzle shield between the home position and the depressed position comprises a pivoting movement of the nozzle shield about a nozzle shield pivot axis; wherein the lever pivot axis is spaced from the nozzle shield pivot axis; wherein, when the lever is at the rest position and the nozzle shield is at the home position, movement of the lever from the rest position to the activated position causes the lever to engage with the nozzle shield, which moves the nozzle shield from the home position to the depressed position; wherein the catch mechanism moves from a raised position to a lowered position on movement of the lever from the rest position to the activated position, and moves from the lowered position to the raised position on movement of the lever from the activated position to the rest position; wherein the piston head has a catch member; wherein the catch mechanism is configured to engage with the catch member; and wherein, when the catch mechanism is engaged with the catch member, movement of the catch mechanism from the raised position to the lowered position moves the piston head from the first position to the second position, and movement of the catch mechanism from the lowered position to the raised position moves the piston head from the second position to the first position.

42. A fluid dispenser, which optionally includes one or more features of any one or more of the previous aspects, wherein the fluid dispenser comprises the fluid dispenser housing in accordance with any one or more of the previous aspects.

43. A nozzle shield, which optionally includes one or more features of any one or more of the previous aspects, comprising: a pivot member that is configured to engage with a fluid dispenser housing, and to permit the nozzle shield to pivot relative to the fluid dispenser housing; and a lever engagement surface that is configured to engage with a lever of the fluid dispenser housing when the lever moves downwardly from a rest position to an activated position, and to disengage from the lever when the lever moves upwardly from the activated position to the rest position.

44. A nozzle shield, which optionally includes one or more features of any one or more of the previous aspects, wherein the pivot member comprises a hook member that removably engages with an axle member of the fluid dispenser housing.

45. A nozzle shield, which optionally includes one or more features of any one or more of the previous aspects, further comprising an arm member that carries the hook member, the arm member comprising a rearwardly facing camming surface that is positioned rearwardly of the hook member; wherein the camming surface extends from a proximate end to a distal end that is positioned downwardly from the proximate end; and wherein the proximate end of the camming surface is closer to the hook member than the distal end of the camming surface is to the hook member.

46. A nozzle shield, which optionally includes one or more features of any one or more of the previous aspects, wherein the camming surface is configured to engage with a forwardly facing cam surface of the fluid dispenser housing; wherein, when the nozzle shield is at a home position, the proximate end of the camming surface engages with the cam surface; and wherein, when the nozzle shield pivots downwardly from the home position to a depressed position, the distal end of the camming surface engages with the cam surface so as to displace the proximate end of the camming surface forwardly and out of engagement with the cam surface.

47. A nozzle shield, which optionally includes one or more features of any one or more of the previous aspects, further comprising a guide surface that faces upwardly and forwardly; wherein the guide surface is configured to engage with a foot member of the fluid dispenser housing when the nozzle shield moves from the depressed position towards the home position, the engagement between the foot member and the guide surface guiding the nozzle shield towards the home position.

48. A nozzle shield, which optionally includes one or more features of any one or more of the previous aspects, further comprising a pump engagement surface that is configured to engage with an actuator member of a fluid dispenser received by the fluid dispenser housing.

49. A nozzle shield, which optionally includes one or more features of any one or more of the previous aspects, further comprising a pump engagement surface that is configured to engage with an actuator member of a table top fluid dispenser received by the fluid dispenser housing.

50. A nozzle shield, which optionally includes one or more features of any one or more of the previous aspects, further comprising a piston engagement surface that is configured to engage with a piston head of a mountable fluid dispenser received by the fluid dispenser housing.

51. A nozzle shield, which optionally includes one or more features of any one or more of the previous aspects, wherein the piston engagement surface is configured to engage with an elongated nozzle of the piston head.

52. A nozzle shield, which optionally includes one or more features of any one or more of the previous aspects, wherein the piston engagement surface comprises a downwardly extending rib.

53. A nozzle shield, which optionally includes one or more features of any one or more of the previous aspects, wherein the movement of the nozzle shield between the home position and the depressed position comprises a displacement of the nozzle shield in a forwards/rearwards direction.

54. A fluid dispenser housing, which optionally includes one or more features of any one or more of the previous aspects, comprising: a lever that is moveable between a rest position and an activated position; and a pump engagement member that is moveable between a home position and a depressed position; wherein the movement of the lever between the rest position and the activated position comprises a pivoting movement of the lever about a lever pivot axis; wherein the movement of the pump engagement member between the home position and the depressed position comprises a pivoting movement of the pump engagement member about a member pivot axis; wherein the lever pivot axis is spaced from the member pivot axis; and wherein, when the lever is at the rest position and the pump engagement member is at the home position, movement of the lever from the rest position to the activated position causes the lever to engage with the pump engagement member, which moves the pump engagement member from the home position to the depressed position.

55. A method, which optionally includes one or more features of any one or more of the previous aspects, comprising: removing a first nozzle shield from a fluid dispenser housing; and attaching a second nozzle shield to the fluid dispenser housing; wherein the fluid dispenser housing comprises a lever that is moveable between a rest position and an activated position, and a biasing mechanism that biases the lever towards the rest position; wherein the first nozzle shield has a lever engagement surface that engages with the lever when the lever moves from the rest position to the activated position, the engagement moving the first nozzle shield from a home position to a depressed position; and wherein the first nozzle shield is configured to disengage from the lever when the lever moves from the activated position to the rest position under the bias of the biasing mechanism.

56. A method, which optionally includes one or more features of any one or more of the previous aspects, wherein the second nozzle shield is configured to remain stationary when the lever moves from the rest position to the activated position.

57. A method, which optionally includes one or more features of any one or more of the previous aspects, comprising: removing a first nozzle shield from a fluid dispenser housing; and attaching a second nozzle shield to the fluid dispenser housing; wherein the fluid dispenser housing comprises a lever that is moveable between a rest position and an activated position, and a biasing mechanism that biases the lever towards the rest position; wherein the second nozzle shield has a lever engagement surface that engages with the lever when the lever moves from the rest position to the activated position, the engagement moving the second nozzle shield from a home position to a depressed position; and wherein the second nozzle shield is configured to disengage from the lever when the lever moves from the activated position to the rest position under the bias of the biasing mechanism.

58. A method, which optionally includes one or more features of any one or more of the previous aspects, wherein the first nozzle shield is configured to remain stationary when the lever moves from the rest position to the activated position.

59. A fluid dispenser housing, which optionally includes one or more features of any one or more of the previous aspects, comprising: a lever that is moveable between a rest position and an activated position; a biasing mechanism that biases the lever towards the rest position; and a pump engagement member that is moveable between a home position and a depressed position; wherein, when the lever is at the rest position and the pump engagement member is at the home position, movement of the lever from the rest position to the activated position causes the lever to engage with the pump engagement member, which moves the pump engagement member from the home position to the depressed position; and wherein, when the lever returns to the rest position from the activated position under the bias of the biasing mechanism, the lever disengages from the pump engagement member.

60. A fluid dispenser housing, which optionally includes one or more features of any one or more of the previous aspects, wherein, when the lever is at the rest position and the pump engagement member is at the home position, movement of the lever from the rest position to the activated position causes the lever to engage with the pump engagement member, which moves the pump engagement member from the home position to the depressed position; and wherein, when the lever returns to the rest position from the activated position under the bias of the biasing mechanism, the lever disengages from the pump engagement member.

61. A fluid dispenser housing, which optionally includes one or more features of any one or more of the previous aspects, wherein the fluid dispenser housing is configured to receive a fluid dispenser; wherein, when the fluid dispenser is absent from the fluid dispenser housing, the lever is at the rest position, the pump engagement member is at the home position, and the lever moves from the rest position to the activated position, the lever engages with the pump engagement member, which moves the pump engagement member from the home position to the depressed position; and wherein, when the fluid dispenser is absent from the fluid dispenser housing, and the lever returns to the rest position from the activated position under the bias of the biasing mechanism, the lever disengages from the pump engagement member.

62. A fluid dispenser housing, which optionally includes one or more features of any one or more of the previous aspects, comprising: a lever that is moveable between a rest position and an activated position; a biasing mechanism that biases the lever towards the rest position; and a pump engagement member that is moveable between a home position and a depressed position; wherein the fluid dispenser housing is configured to receive a fluid dispenser; wherein, when the fluid dispenser is absent from the fluid dispenser housing, the lever is at the rest position, the pump engagement member is at the home position, and the lever moves from the rest position to the activated position, the lever engages with the pump engagement member, which moves the pump engagement member from the home position to the depressed position; and wherein, when the fluid dispenser is absent from the fluid dispenser housing, and the lever returns to the rest position from the activated position under the bias of the biasing mechanism, the lever disengages from the pump engagement member.

BRIEF DESCRIPTION OF THE DRAWINGS

Further aspects and advantages of the invention will appear from the following description taken together with the accompanying drawings, in which.

DETAILED DESCRIPTION OF THE DRAWINGS

Figure 1:
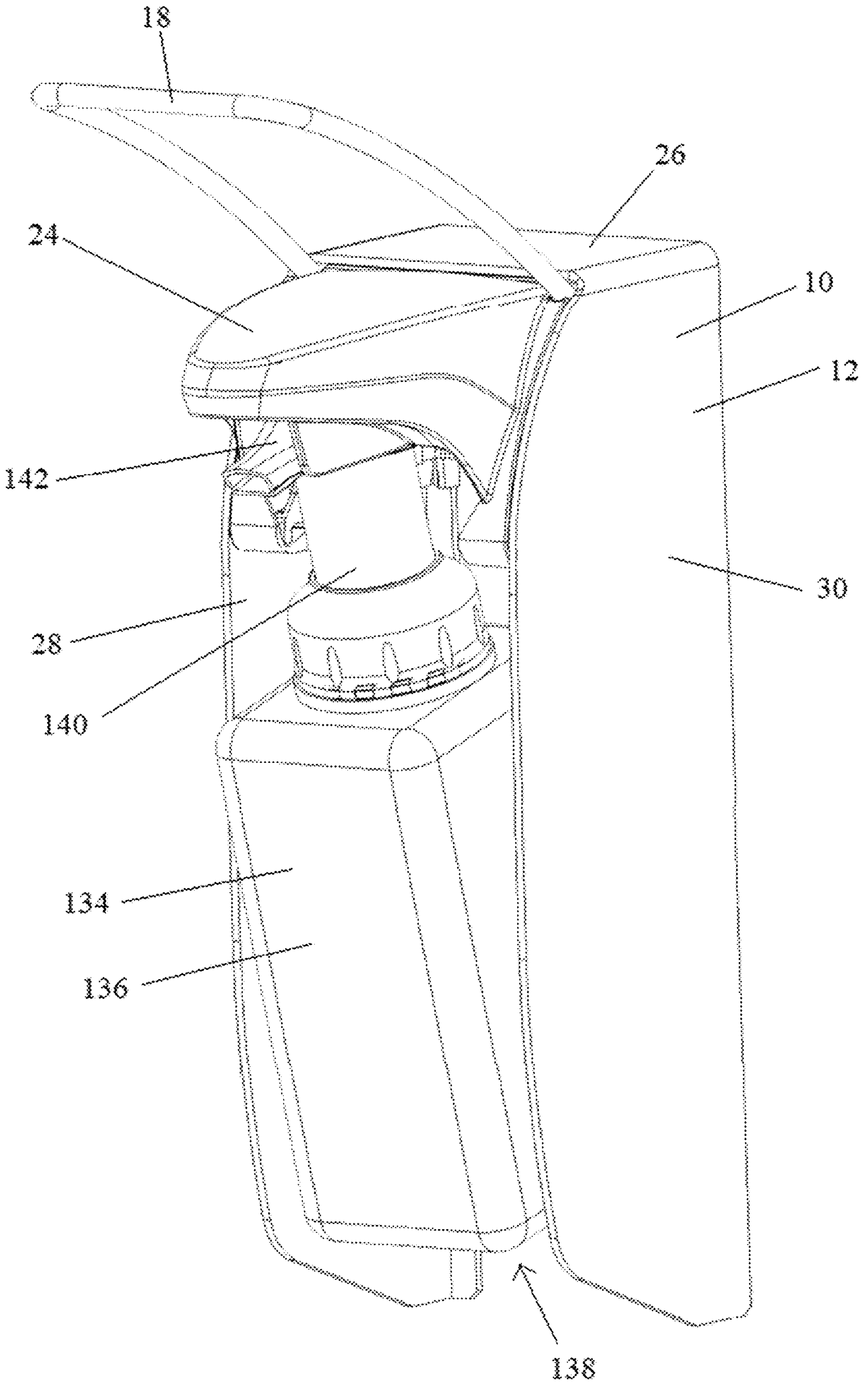
FIG. 1 is a perspective view of a fluid dispenser housing in accordance with an embodiment of the present invention, with a table top fluid dispenser received by the housing.
Figure 2:
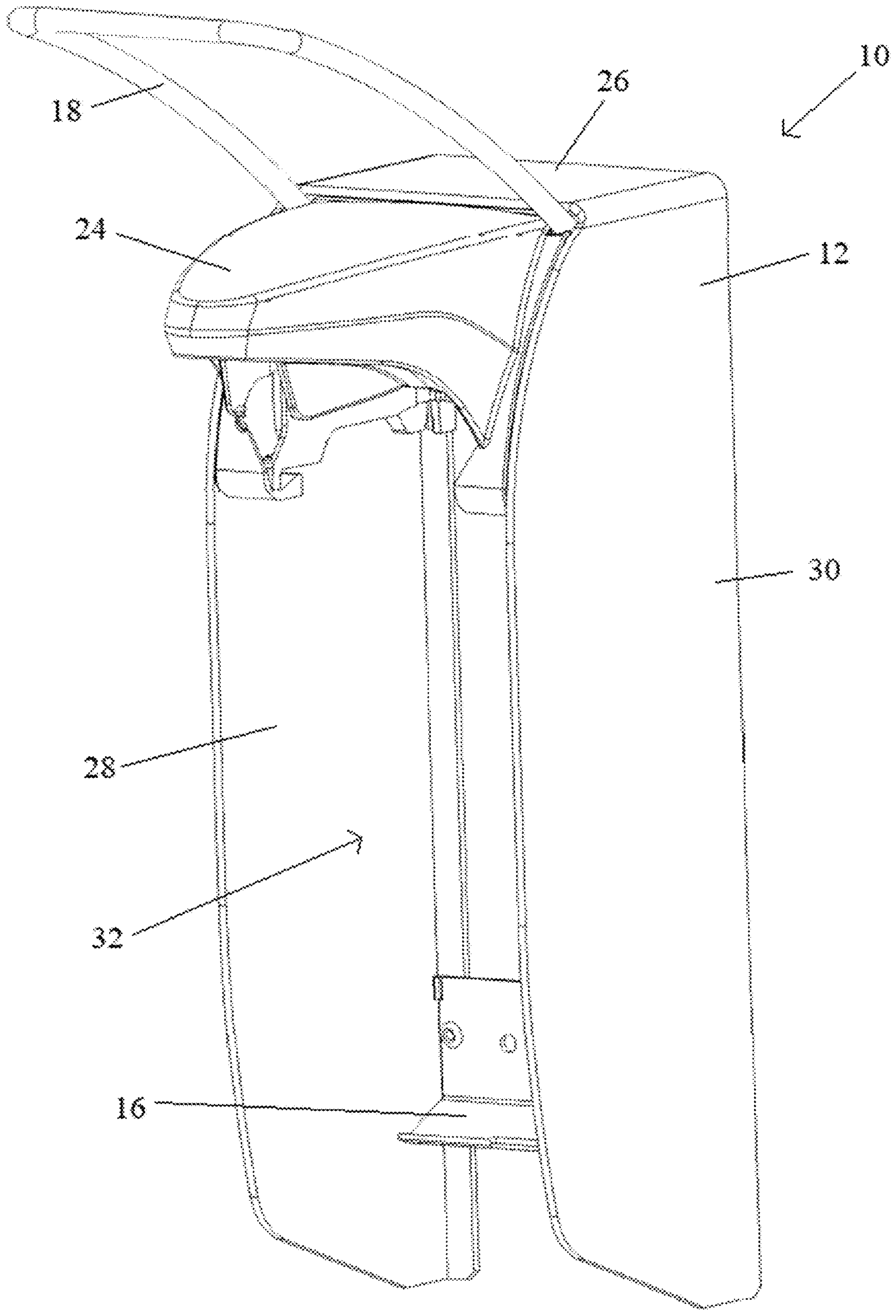
FIG. 2 is a perspective view of the fluid dispenser housing shown in FIG. 1, without the table top fluid dispenser.

FIGS. 1 and 2 show a fluid dispenser housing 10 in accordance with a preferred embodiment of the present invention. The fluid dispenser housing 10 includes an external housing body 12, an internal housing chassis 14, a support member 16, a lever 18, a biasing mechanism 20, a catch mechanism 22, and a nozzle shield 24.

The housing body 12 is configured to be mounted to a vertical support structure, not shown, such as a wall or a post. The housing body 12 includes a top wall 26, a left side wall 28, and a right side wall 30, which together define an internal cavity 32.

Figure 3:
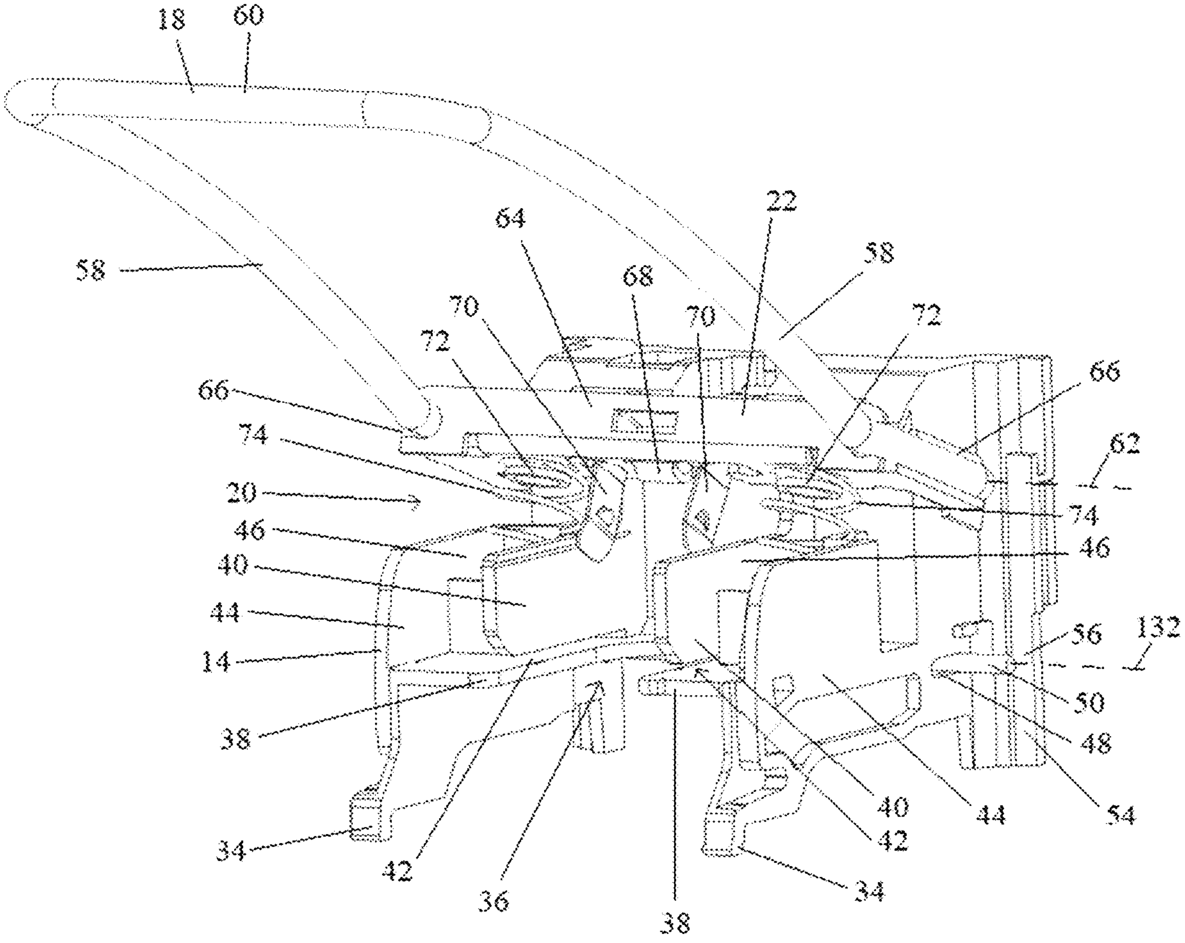
FIG. 3 is a perspective view of a lever and a housing chassis of the fluid dispenser housing shown in FIG. 1.

The housing chassis 14 is positioned within the internal cavity 32 near the top of the internal cavity 32, and is rigidly connected to the housing body 12 so as to remain stationary relative to the housing body 12. The housing chassis 14 is best shown in FIG. 3 as having two downwardly extending foot members 34 that are positioned at the front of the housing chassis 14. The housing chassis 14 has a central pump mounting body 36 with two horizontal shoulder members 38 and two vertical holding members 40, each of the vertical holding members 40 being spaced a short distance above a respective one of the horizontal shoulder members 38 so as to define a horizontal slot 42 therebetween.

The housing chassis 14 has outer walls 44 that are spaced laterally outwardly from the vertical holding members 40. Two spring carrying chambers 46 are defined between the outer walls 44 and the vertical holding members 40. At the rear of the housing chassis 14, behind the pump mounting body 28 and the spring carrying chambers 46, each of the outer walls 44 defines a horizontal axle slotway 48. An axle member 50 extends horizontally between the axle slotways 48, and is moveable within the slotways 48 between a rear position and a forward position. The housing chassis 14 also has cam members 54 that extend laterally outwardly from the outer walls 44 behind each of the axle slotways 48. The cam members 54 each have a forwardly facing cam surface 56.

Figure 10:
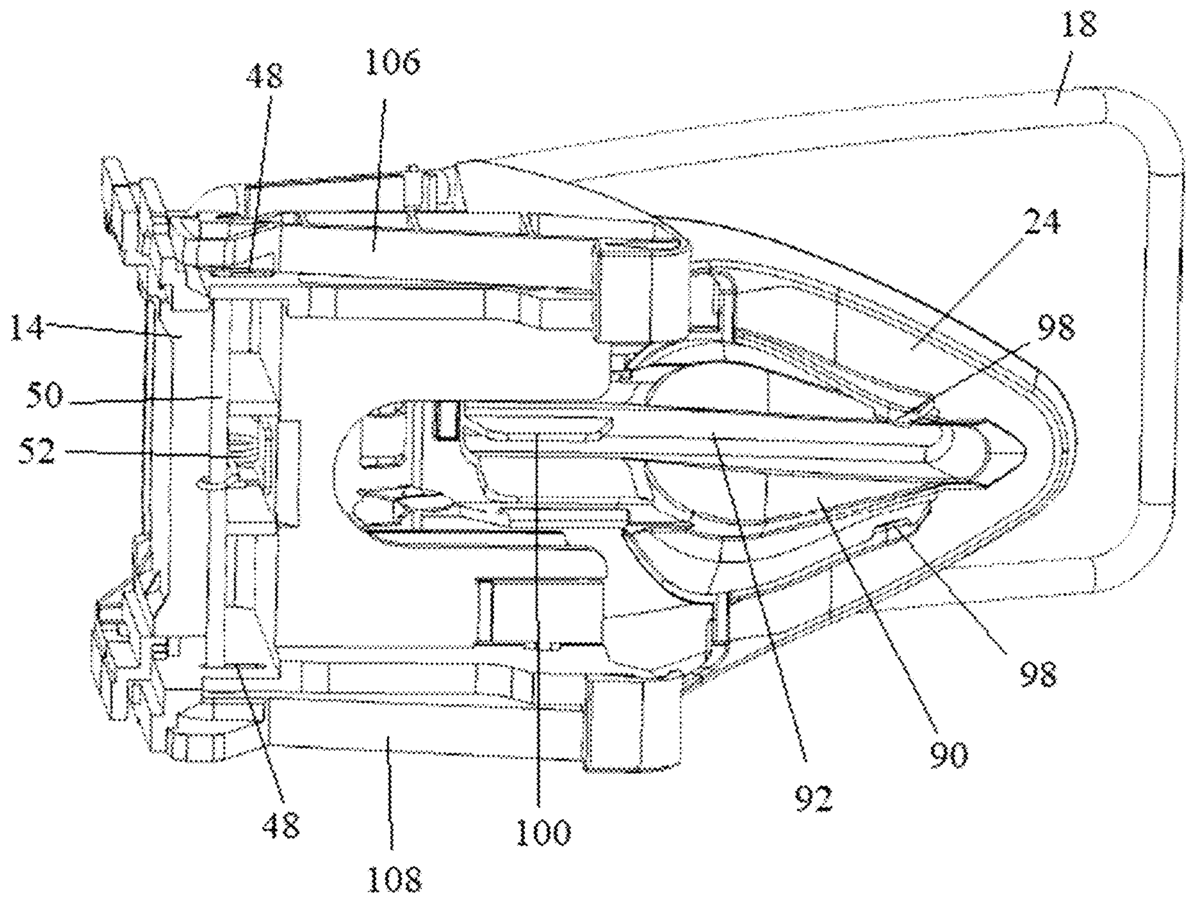
FIG. 10 is a bottom perspective view of the nozzle shield, the lever, and the housing chassis shown in FIG. 9.

As best shown in FIG. 10, the housing chassis 14 carries a rear spring member 52 that is connected to the axle member 50, and biases the axle member 50 towards the rear position.

Figure 9:
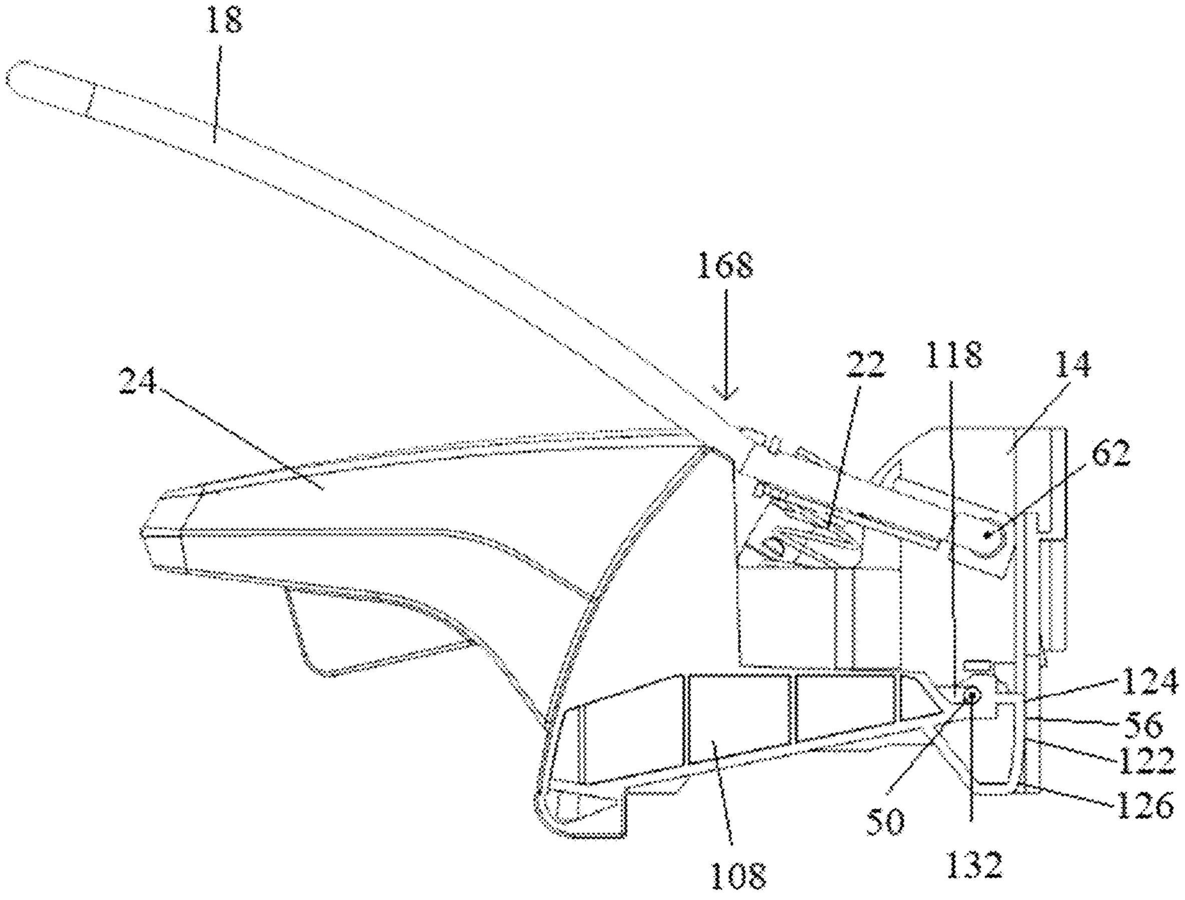
FIG. 9 is a side view of the nozzle shield, the lever, and the housing chassis of the fluid dispenser housing shown in FIG. 1, with the lever shown at a rest position and the nozzle shield shown at a home position.
Figure 11:
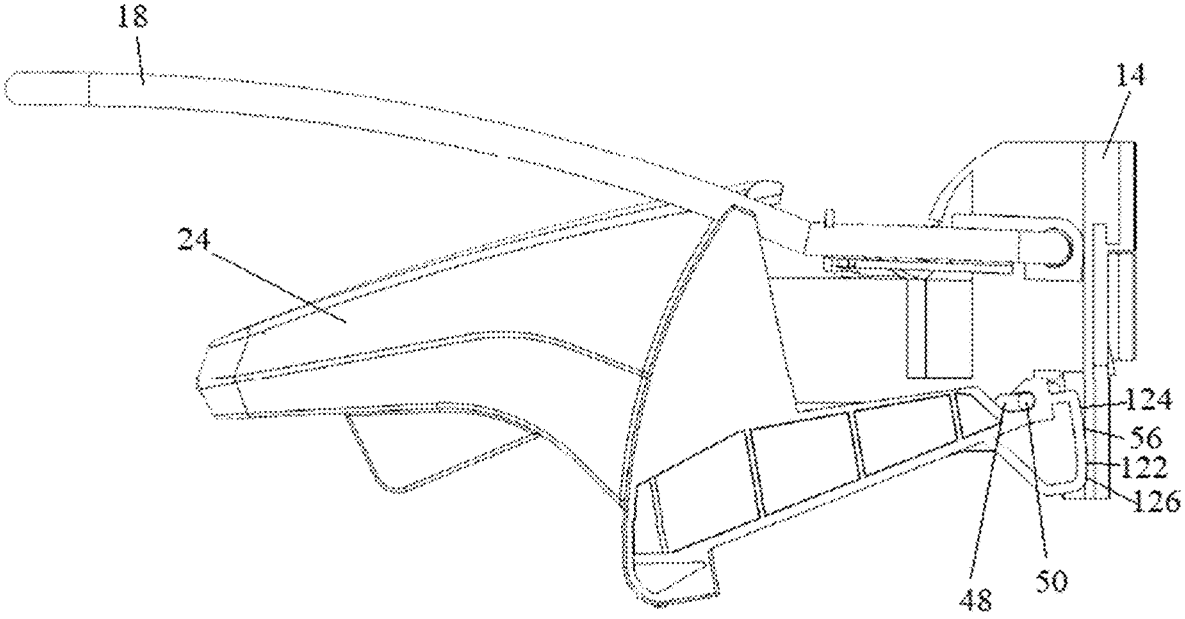
FIG. 11 is a side view of the nozzle shield, the lever, and the housing chassis shown in FIG. 9, with the lever shown at an activated position and the nozzle shield shown at a depressed position.
Figure 17:
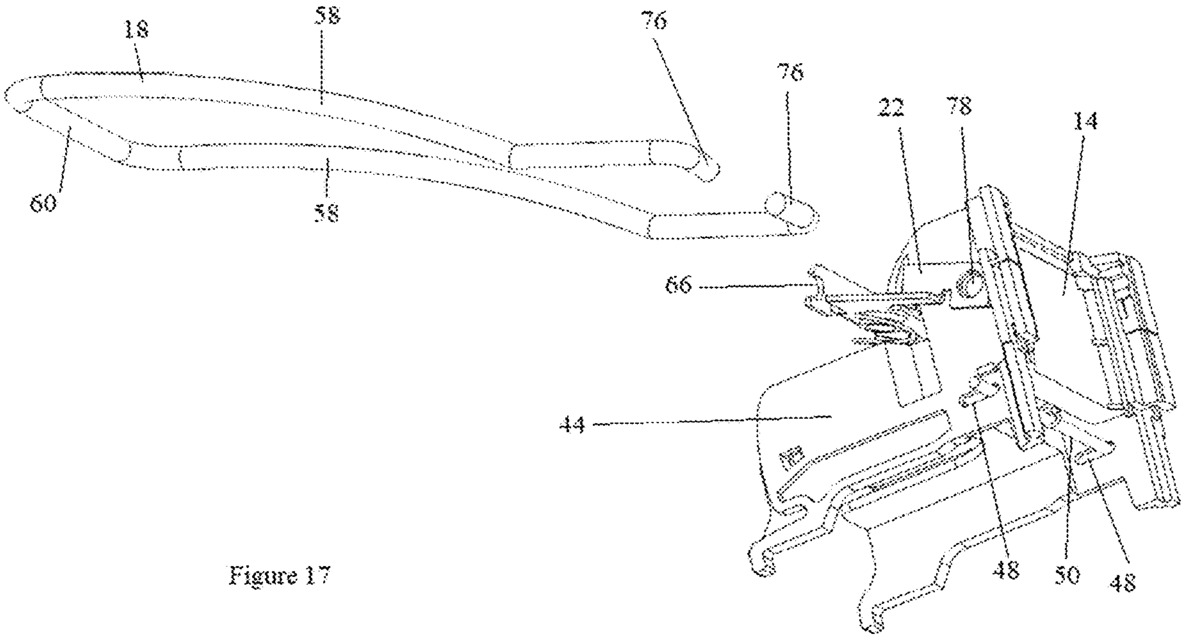
FIG. 17 is a partially exploded perspective view of the lever and the housing chassis shown in FIG. 3.

The lever 18 has two arms 58 that extend forwardly to a horizontal connecting portion 60. As can be seen in FIG. 17, each arm 58 has a laterally inwardly extending end portion 76. The end portions 76 of the lever 18 extend laterally inwardly through lever mounting holes 78 in the outer walls 44 of the housing chassis 14. The lever 18 is moveable relative to the housing chassis 14 between a rest position, as shown in FIG. 9, and an activated position, as shown in FIG. 11, by pivoting about a lever axis 62 defined by the lever mounting holes 78.

The catch mechanism 22 is best shown in FIG. 3 as including a plate member 64 that extends between the arms 58 of the lever 18. The plate member 64 has two lateral channels 66, each of which rigidly connects to one of the arms 58 of the lever 18, such that movement of the lever 18 between the rest position shown in FIG. 9 and the activated position shown in FIG. 11 moves the plate member 64 between a raised position and a lowered position.

As can be seen in FIG. 3, the plate member 64 has a central pump engagement body 68 and two downwardly extended catch fingers 70 positioned on either side of the pump engagement body 68. Two spring attachment members 72 are positioned laterally outwardly from the catch fingers 70.

In the embodiment shown in the Figures, the biasing mechanism 20 is in the form of two springs 74, which are each received by one of the spring carrying chambers 46 and extend between the housing chassis 14 and the spring attachment members 72 of the catch mechanism 22. The springs 74 bias the catch mechanism towards the raised position, which in turn biases the lever 18 towards the rest position.

Figure 4:
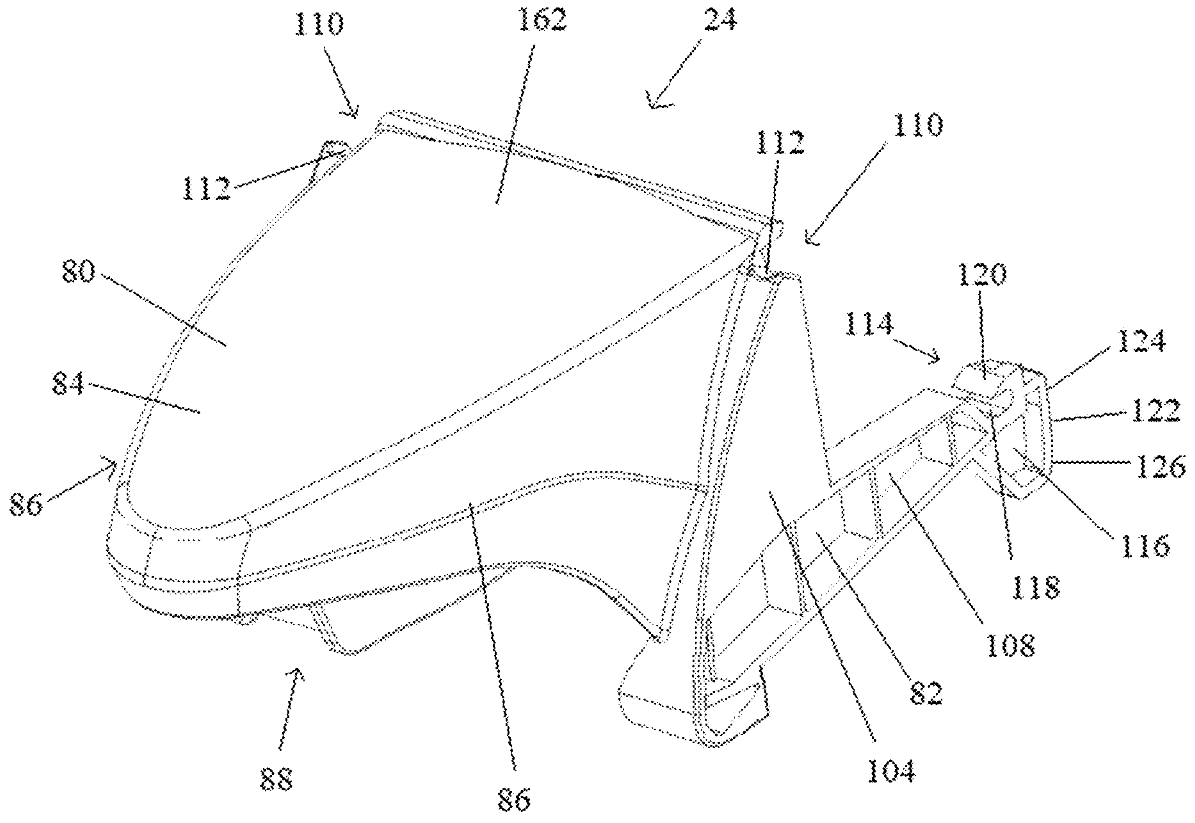
FIG. 4 is a front perspective view of a nozzle shield of the fluid dispenser housing shown in FIG. 1.
Figure 5:
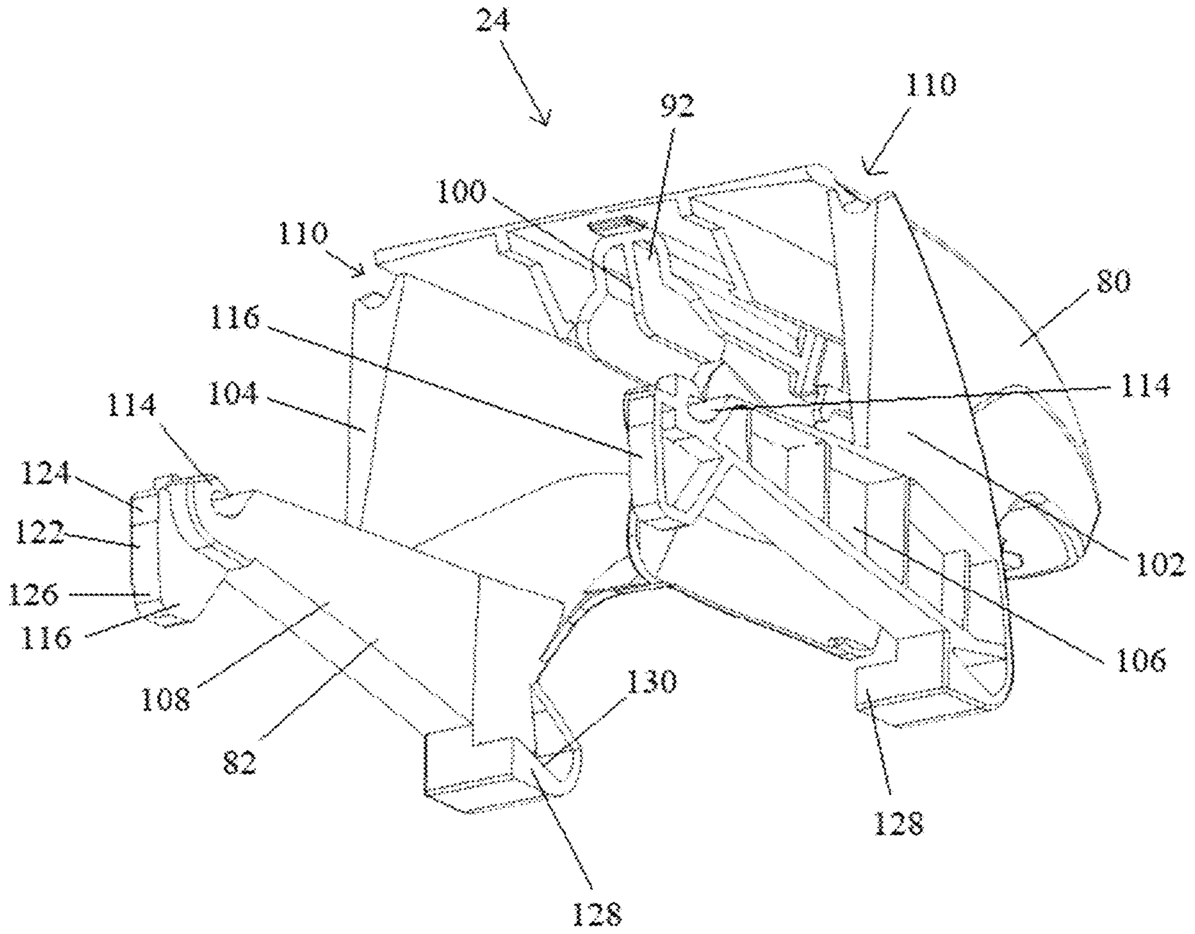
FIG. 5 is a rear perspective view of the nozzle shield shown in FIG. 4.
Figure 6:
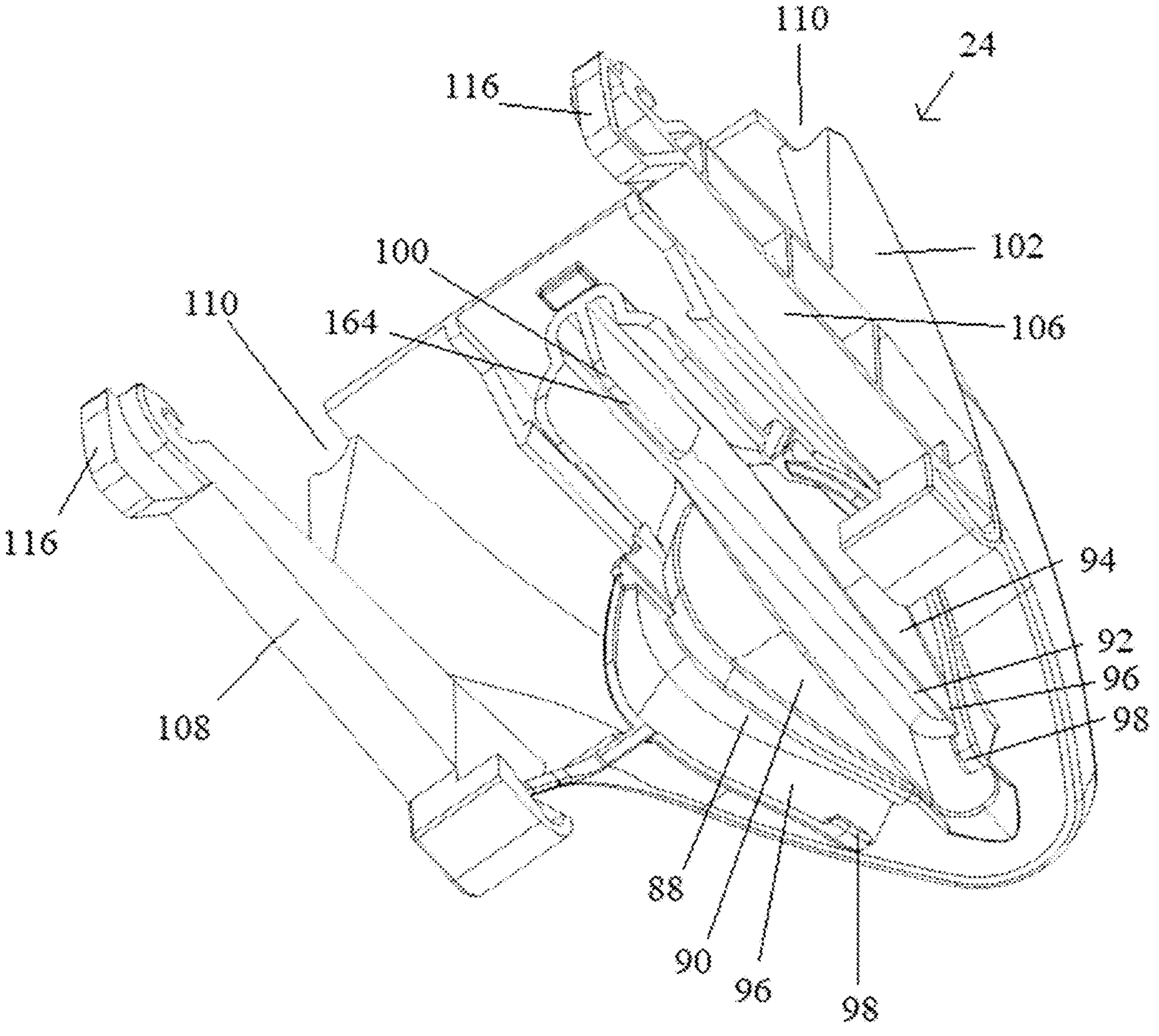
FIG. 6 is a bottom perspective view of the nozzle shield shown in FIG. 4.

As can be seen in FIGS. 4 to 6, the nozzle shield 24 includes a forwardly extending nose portion 80 and a rearwardly extending attachment portion 82. The nose portion 80 has a top wall 84 and two side walls 86. As can be seen in FIG. 6, the underside of the top wall 84 carries a pump engagement portion 88. The pump engagement portion 88 defines a pump engagement cavity 90 and a central channel 92. The pump engagement cavity 90 has a top surface 94 and two side surfaces 96. At the bottom front corner of each side surface 96 there is a catch body 98 that extends laterally inwardly from the side surface 96.

The central channel 92 extends from the rear of the top wall 84 to the front of the top wall 84. A rib 100 extends downwardly at the rear of the central channel 92.

As can be seen in FIG. 5, the attachment portion 82 of the nozzle shield 24 includes a left shoulder 102, a right shoulder 104, a left arm 106, and a right arm 108. Each shoulder 102, 104 is attached to one of the side walls 86 of the nose portion 80, and defines an upwardly open shoulder cavity 110 at the top of the shoulder 102, 104, adjacent to the top wall 84 of nose portion 80. Each shoulder cavity 110 has an upwardly facing lever engagement surface 112.

The left arm 106 extends rearwardly from the bottom of the left shoulder 102, and the right arm 108 extends rearwardly from the bottom of the right shoulder 104. Each of the arms 106, 108 has a hook member 114 and a camming member 116. Each hook member 114 has a hook channel 118 and a hook 120 that extends forwardly over a rear portion of the hook channel 118, so as to leave a front portion of the hook channel 118 open upwardly.

The camming members 116 extend rearwardly and downwardly from the hook members 114. Each camming member 116 has a rearwardly facing camming surface 122 that extends from a proximate end 124 to a distal end 126. The proximate end 124 is located above the distal end 126, and is closer to the hook member 114 than the distal end 126 is to the hook member 114.

Figure 13:
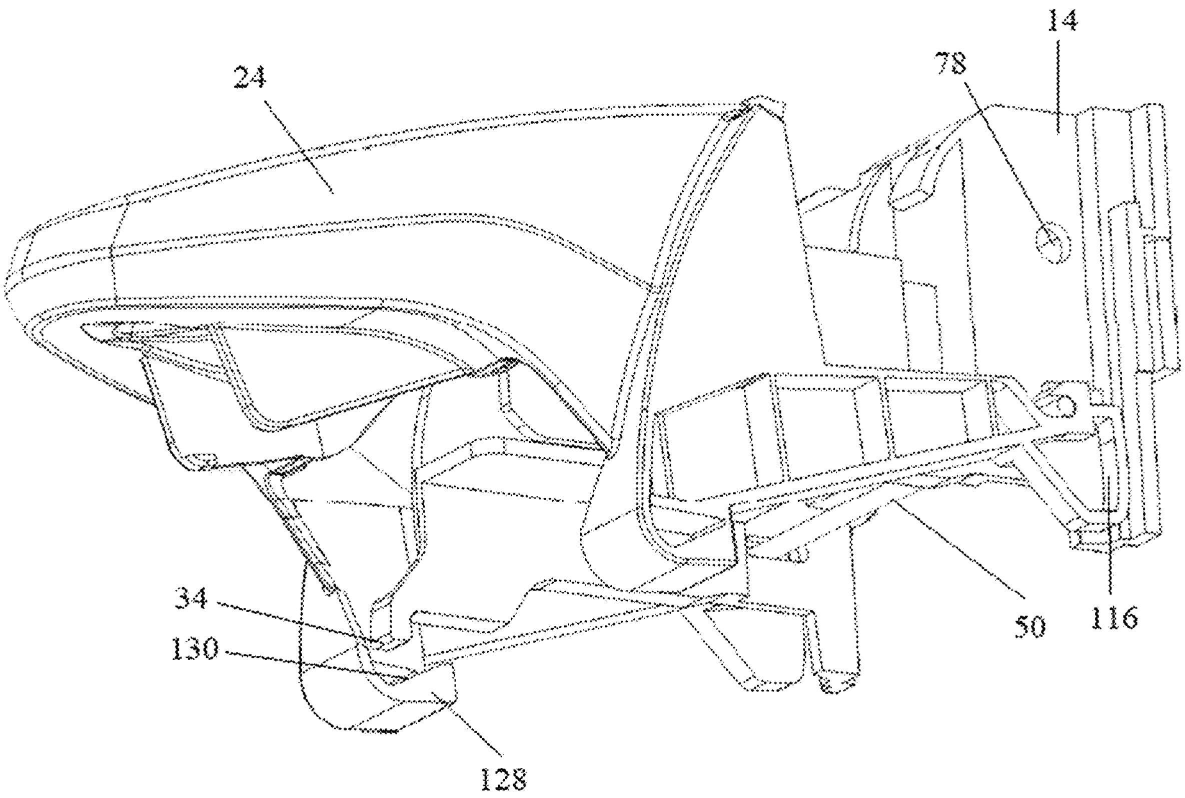
FIG. 13 is a front perspective view of the nozzle shield and the housing chassis of the fluid dispenser housing shown in FIG. 1, with the nozzle shield shown at an intermediate position between the home position and the depressed position.

As can be best seen in FIGS. 5 and 13, each arm 106, 108 has a guide member 128 that extends laterally inwardly from the front of the arm 106, 108. Each guide member 128 has a guide surface 130 that is sloped so as to face forwardly and upwardly.

When the nozzle shield 24 is attached to the housing chassis 14, as can be seen in FIG. 9, each lateral end of the axle member 50 is received in one of the hook channels 118. The nozzle shield 24 is moveable relative to the housing chassis 14 between the home position shown in FIG. 9 and the depressed position shown in FIG. 11. When the nozzle shield 24 is at the home position and the lever 18 is at the rest position, as shown in FIG. 9, each arm 58 of the lever 18 is received by one of the shoulder cavities 110 of the nozzle shield 24. When the lever 18 is moved to the activated position, for example by a user pulling the connecting portion 60 of the lever 18 downwardly, the arms 58 of the lever 18 engage with the lever engagement surfaces 112 of the nozzle shield 24, which causes the nozzle shield 24 to move from the home position shown in FIG. 9 to the depressed position shown in FIG. 11.

The movement of the nozzle shield 24 from the home position to the depressed position includes a pivoting movement of the nozzle shield 24 about a nozzle shield pivot axis 132, which is defined by the axle member 50. The nozzle shield 24 also moves forwardly relative to the housing chassis 14 when the nozzle shield 24 moves from the home position to the depressed position. The forwards movement of the nozzle shield 24 is caused by the engagement between the camming surface 122 of the nozzle shield 24 with the cam surface 56 of the housing chassis 18. In particular, when the nozzle shield 24 pivots from the home position towards the depressed position, the distal end 126 of the camming surface 122 moves rearwardly relative to the axle member 50. Due to the engagement of the camming surface 122 with the cam surface 52, in order to accommodate the rearwards movement of the distal end 126 relative to the axle member 50, the hook member 114 must pull the axle member 50 forwardly against the bias of the spring member 52. This moves the axle member 50 forwardly in the axle slotways 48 from the rear position towards the forwards position.

Figure 12:
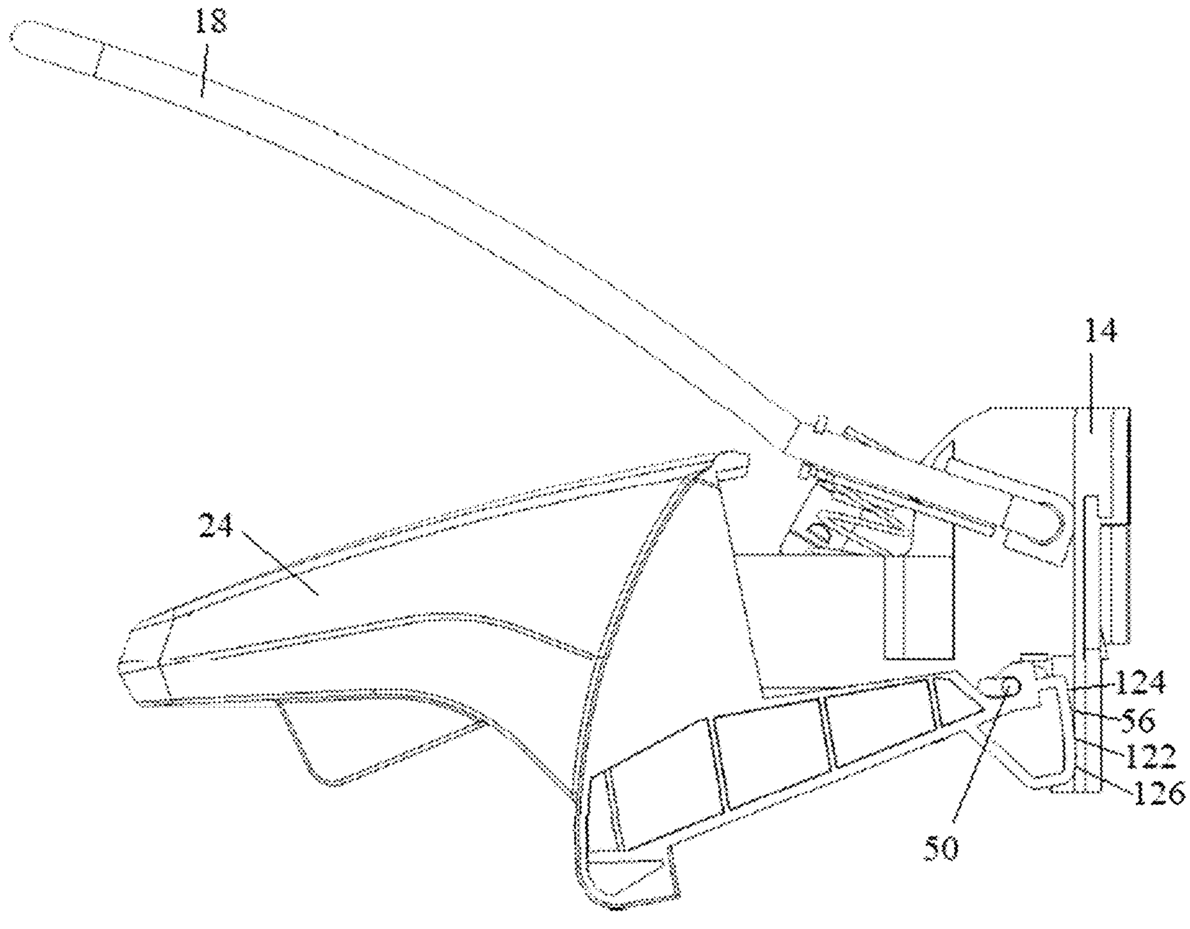
FIG. 12 is a side view of the nozzle shield, the lever, and the housing chassis shown in FIG. 9, with the lever shown at the rest position and the nozzle shield shown at the depressed position.

When the lever 18 is released, the biasing mechanism 20 returns the lever 18 to the rest position, as shown in FIG. 12. Because the shoulder cavities 110 are upwardly open, the lever 18 disengages from the nozzle shield 24 when the lever 18 pivots upwardly from the activated position. The biasing mechanism 20 therefore does not return the nozzle shield 24 from the depressed position back to the home position. In the absence of another force applied to the nozzle shield 24, the nozzle shield 24 will therefore remain at the depressed position when the lever 18 returns to the rest position, as shown in FIG. 12.

As can be seen in FIG. 2, the support member 16 is in the form of a shelf or ledge that extends between the side walls 28, 30 of the housing body 12 near the bottom of the internal cavity 32. The support member 16 may be used, for example, to support a table top fluid dispenser 134 received by the housing 10, as shown in FIG. 1.

Figure 7:
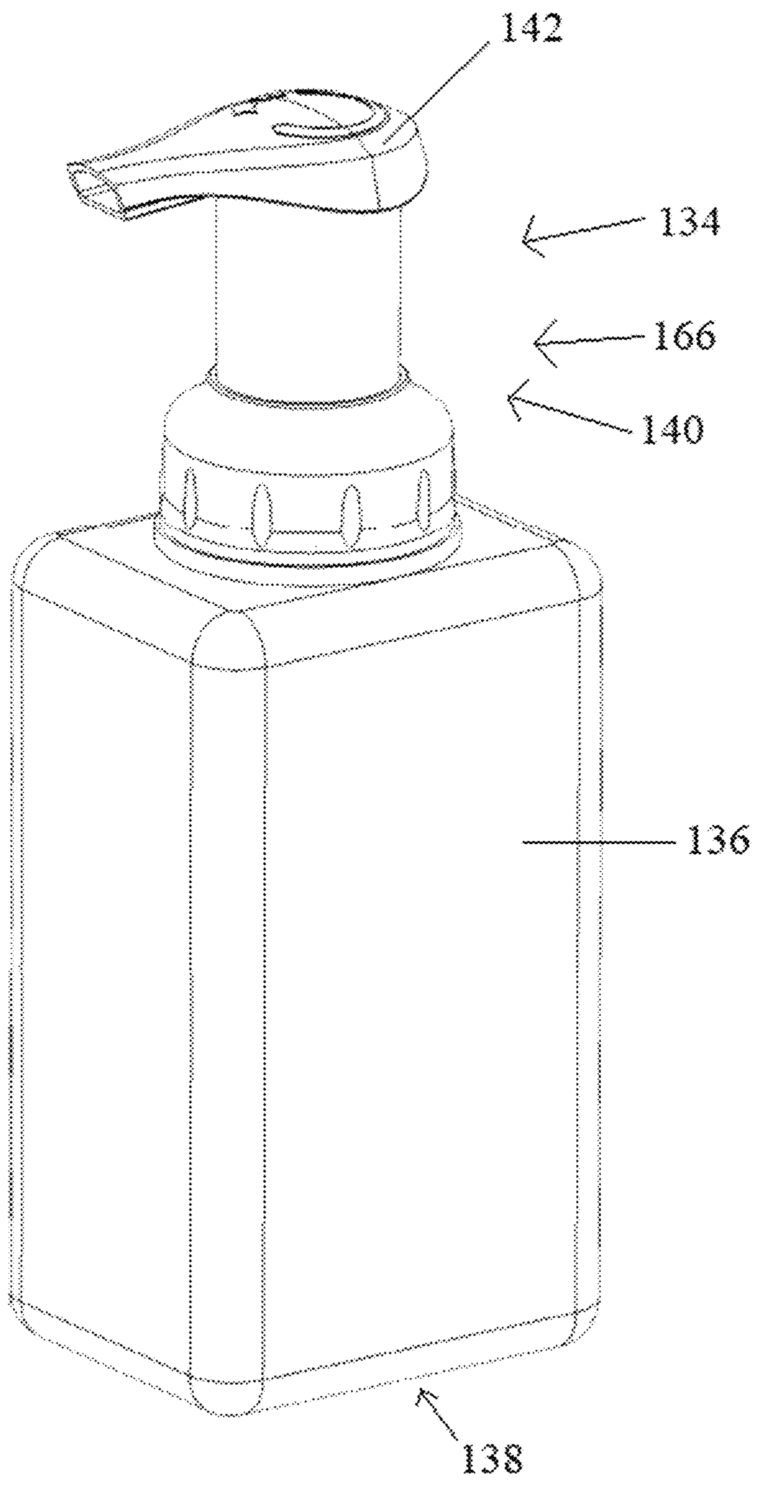
FIG. 7 is a perspective view of the table top fluid dispenser shown in FIG. 1.
Figure 8:
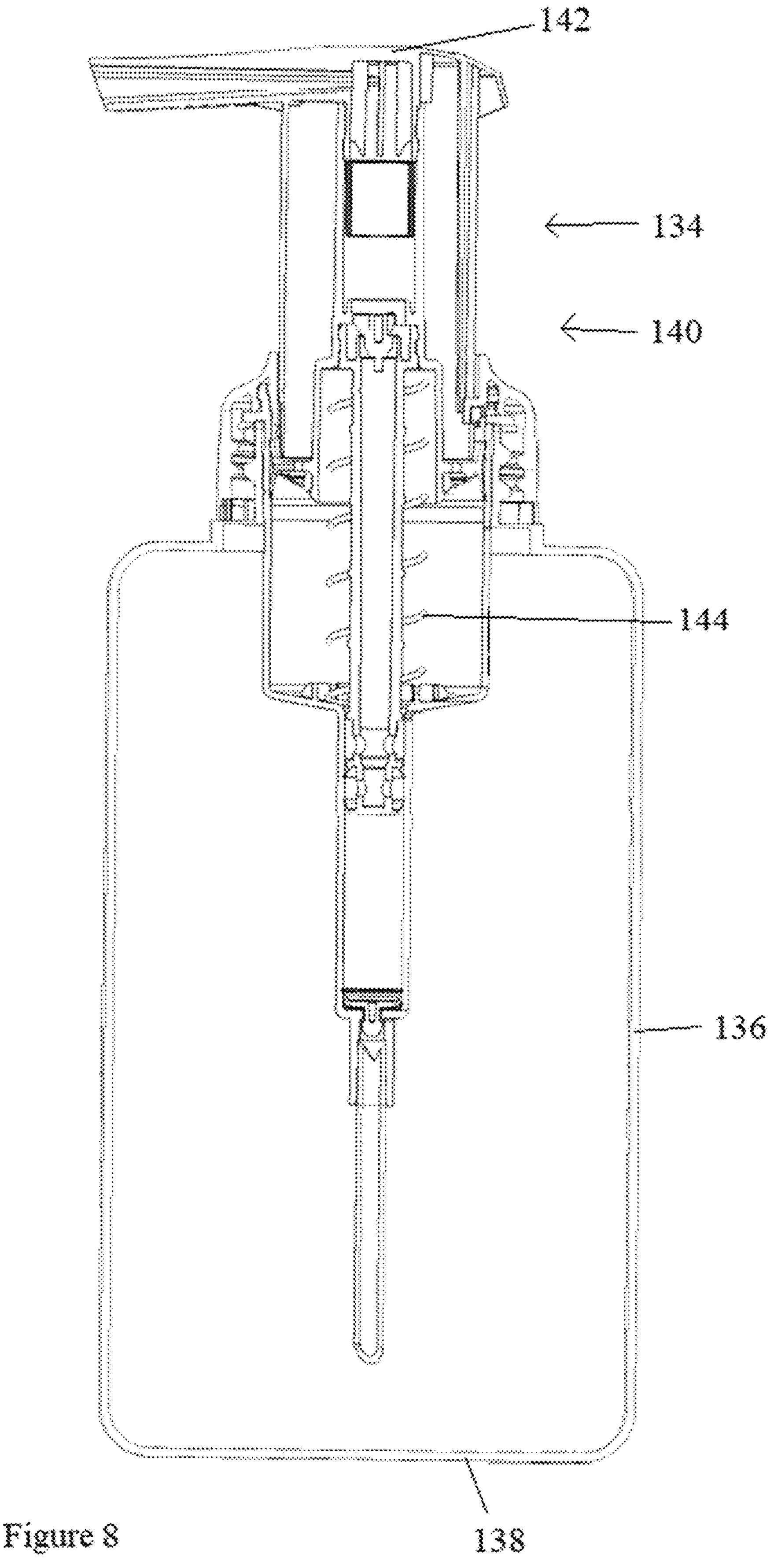
FIG. 8 is cross-sectional view of the table top fluid dispenser shown in FIG. 7.

An example of a table top fluid dispenser 134 that could be received by the housing 10 is shown in FIGS. 7 and 8. The table top fluid dispenser 134 has a reservoir 136 in the form of a bottle with a bottom surface 138 that can be placed on a horizontal support surface, such as a table or a countertop. A fluid pump 140 having a dispensing head 142 is attached to the top of the reservoir 136 for dispensing fluid, such as hand cleaning fluid, from the reservoir 136. To dispense fluid, the dispensing head 142 is pushed downwardly relative to the reservoir 136 from the extended position shown in FIG. 7 to a retracted position, not shown. As can be seen in FIG. 8, the fluid pump 140 includes an internal pump biasing member 144, in the form of a spring, which biases the dispensing head 142 towards the extended position, as is known in the art.

When the table top fluid dispenser 134 is placed in the housing 10, the bottom surface 138 of the reservoir 136 is supported by the support member 16 and the dispensing head 142 is received by and engages with the pump engagement cavity 90 of the nozzle shield 24. As can be seen in FIG. 1, the table top fluid dispenser 134 is held in the internal cavity 32 of the housing 10 in a tilted orientation, with the dispensing head 142 tilted forwardly relative to the bottom surface 138. The pump engagement cavity 90 preferably has a shape that is complementary to the shape of the dispensing head 142, so that the dispensing head 142 sits securely within the pump engagement cavity 90. Optionally, the catch bodies 98 that can be seen in FIG. 6 engage with an underside of the dispensing head 142, to further assist in holding the dispensing head 142 in place within the pump engagement cavity 90. In some embodiments of the invention, the pump engagement cavity 90 is selected to have a unique shape that is designed to only receive a specific dispensing head 142 geometry, thus acting as a lock out feature that ensures only compatible fluid dispensers 134 are able to be used with the housing 10.

To dispense fluid from the table top fluid dispenser 134, the lever 18 is manually depressed from the rest position shown in FIGS. 1 and 9 to the activated position shown in FIG. 11. As the lever 18 moves towards the activated position, the lever 18 engages with the lever engagement surfaces 112 of the nozzle shield 24, which causes the nozzle shield 24 to move from the home position shown in FIGS. 1 and 9 towards the depressed position shown in FIG. 11.

As the nozzle shield 24 moves from the home position towards the depressed position, the distance between the pump engagement cavity 90 and the support member 16 decreases, which forces the dispensing head 142 to move from the extended position to the retracted position against the bias of the pump biasing member 144. The movement of the dispensing head 142 from the extended position to the retracted position causes an allotment of fluid to be dispensed from the dispensing head 142, for example onto a user's hand.

Upon release of the lever 18, the biasing mechanism 20 returns the lever 18 to the rest position. As the lever 18 moves from the activated position to the rest position, the lever 18 disengages from the nozzle shield 24, leaving the nozzle shield 24 at the depressed position as shown in FIG. 12. The disengagement of the lever 18 from the nozzle shield 24 prevents the nozzle shield 24 from rapidly returning to the home position, which might otherwise cause the table top fluid dispenser 134 to disengage from the pump engagement cavity 90 and fall out of the housing 10.

Once the downwards pressure applied by the lever 18 is released, the dispensing head 142 begins to return to the extended position under the bias of the pump biasing member 144. As the dispensing head 142 moves towards the extended position, the dispensing head 142 engages with the top surface 94 of the pump engagement cavity 90, which moves the nozzle shield 24 from the depressed position towards the home position.

As can be seen in FIG. 13, when the nozzle shield 24 is attached to the housing chassis 14, the foot members 34 of the housing chassis 14 are positioned above the guide surfaces 130 of the nozzle shield 24. As the nozzle shield 24 pivots upwardly from the depressed position towards the home position, the foot members 34 engage with the guide surfaces 130. Due to the slope of the guide surfaces 130, the engagement between the foot members 34 and the guide surfaces 130 forces the nozzle shield 24 to move rearwardly. The engagement between the foot members 34 and the guide surfaces 130 thus helps to guide the nozzle shield 24 back to the home position.

The engagement between the camming surfaces 122 and the cam surfaces 56 also helps to guide the nozzle shield 24 back to the home position. In particular, as the nozzle shield 24 moves rearwardly relative to the housing chassis 14, the engagement between the camming surfaces 122 and the cam surfaces 56 forces the nozzle shield 24 to pivot, so that the distal end 126 of the camming surfaces 122 moves forwardly relative to the hook members 114.

The rearwards force applied by the spring member 52 on the axle member 50 also helps to guide the nozzle shield 24 back to the home position, by pulling the hook members 114 rearwardly relative to the housing chassis 14.

Preferably, the geometry of the camming members 116, the geometry of the cam members 54, and/or the strength of the spring member 52 is selected so that the rearwards force applied by the spring member 52 on the axle member 50 is sufficient to hold the nozzle shield 24 at the home position in the absence of another force acting on the nozzle shield 24, but is insufficient to independently move the nozzle shield 24 from the depressed position back to the home position. This preferably helps to prevent the nozzle shield 24 from drooping or falling from the home position to the depressed position under the force of gravity when no fluid dispenser 134 is installed in the housing 10. If the force applied by the spring member 52 was too strong, this could cause the nozzle shield 24 to pivot back to the home position too quickly, thus risking disengagement between the nozzle shield 24 and a table top fluid dispenser 134 received by the housing 10.

Figure 14:
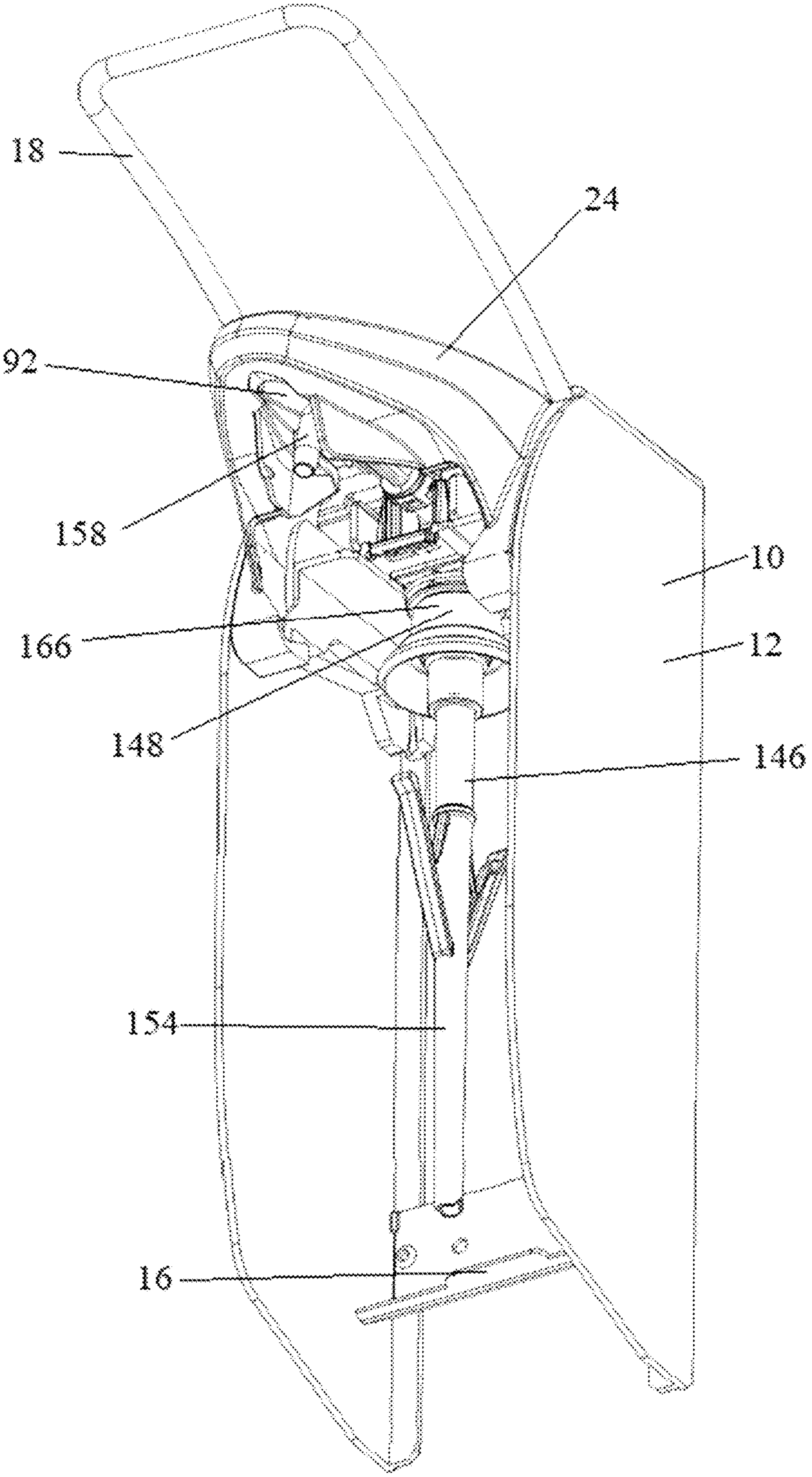
FIG. 14 is a perspective view of the fluid dispenser housing shown in FIG. 1, with a mountable fluid dispenser pump received by the housing.

The housing 10 is also able to receive a mountable fluid dispenser 146, as shown in FIG. 14. The mountable fluid dispenser 146 includes a mountable pump 148 and a fluid reservoir, not shown. Any suitable fluid reservoir could be used, such as those shown and described in US 2022/0176394 to Ophardt et al., published Jun. 9, 2022.

The mountable pump 148 includes a piston head 150, a piston chamber forming body 152, and a dip tube 154. The piston head 150 has a catch member 156 and an elongated spout tube 158. The mountable pump 148 is operable to draw fluid from the fluid reservoir and dispense the fluid from the spout tube 158 on movement of the piston head 150 relative to the piston chamber forming body 152 between an extended first position and a retracted second position, as is known in the art.

Figure 15:
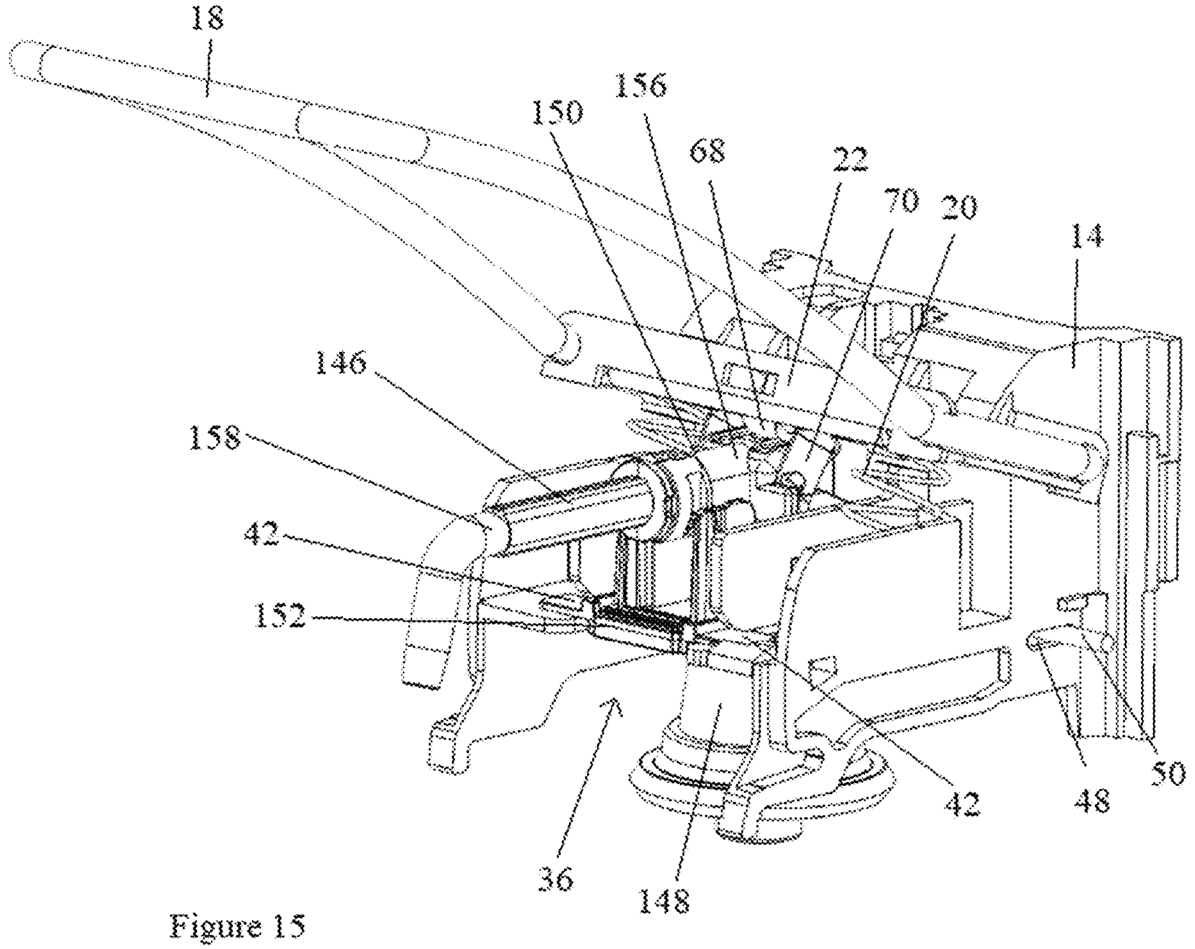
FIG. 15 is a front perspective view of the lever and the housing chassis of the fluid dispenser housing shown in FIG. 1, together with the mountable fluid dispenser pump shown in FIG. 14, with a dip tube of the mountable fluid dispenser pump omitted.

As can be seen in FIG. 15, when the mountable pump 148 is received by the housing 10, the piston chamber forming body 152 engages with the horizontal slots 42 of the central pump mounting body 36, and the catch member 156 of the piston head 150 engages with the catch mechanism 22 of the housing 10 in a manner as is known the art. The engagement between the catch member 156 and the catch mechanism 22 is shown and described in more detail in US 2022/0176394 to Ophardt et al., published Jun. 9, 2022.

The engagement between the catch member 156 and the catch mechanism 22 causes the piston head 150 to move relative to the piston chamber forming body 152 between the extended first position, when the catch mechanism 22 is at the raised position, and the retracted second position, when the catch mechanism 22 is at the lowered position.

The mountable fluid dispenser 146 can thus be operated to dispense fluid by depressing the lever 18 from the rest position to the activated position, which in turn moves the catch mechanism 22 from the raised position to the lowered position and the piston head 150 from the first position to the second position, and then releasing the lever 18, so that the biasing mechanism 20 returns the catch mechanism 22 from the lower position to the raised position, which in turn moves the piston head 150 from the second position back to the first position.

As can be seen in FIG. 14, when the mountable fluid dispenser 146 is received by the housing 10, the nozzle shield 24 substantially covers the elongated spout tube 158 of the mountable pump 148. This helps to prevent the spout tube 158 from being touched, thus helping to reduce contamination. The central channel 92 preferably has a size and a shape that is selected to accommodate the elongated spout tube 158.

Figure 16:
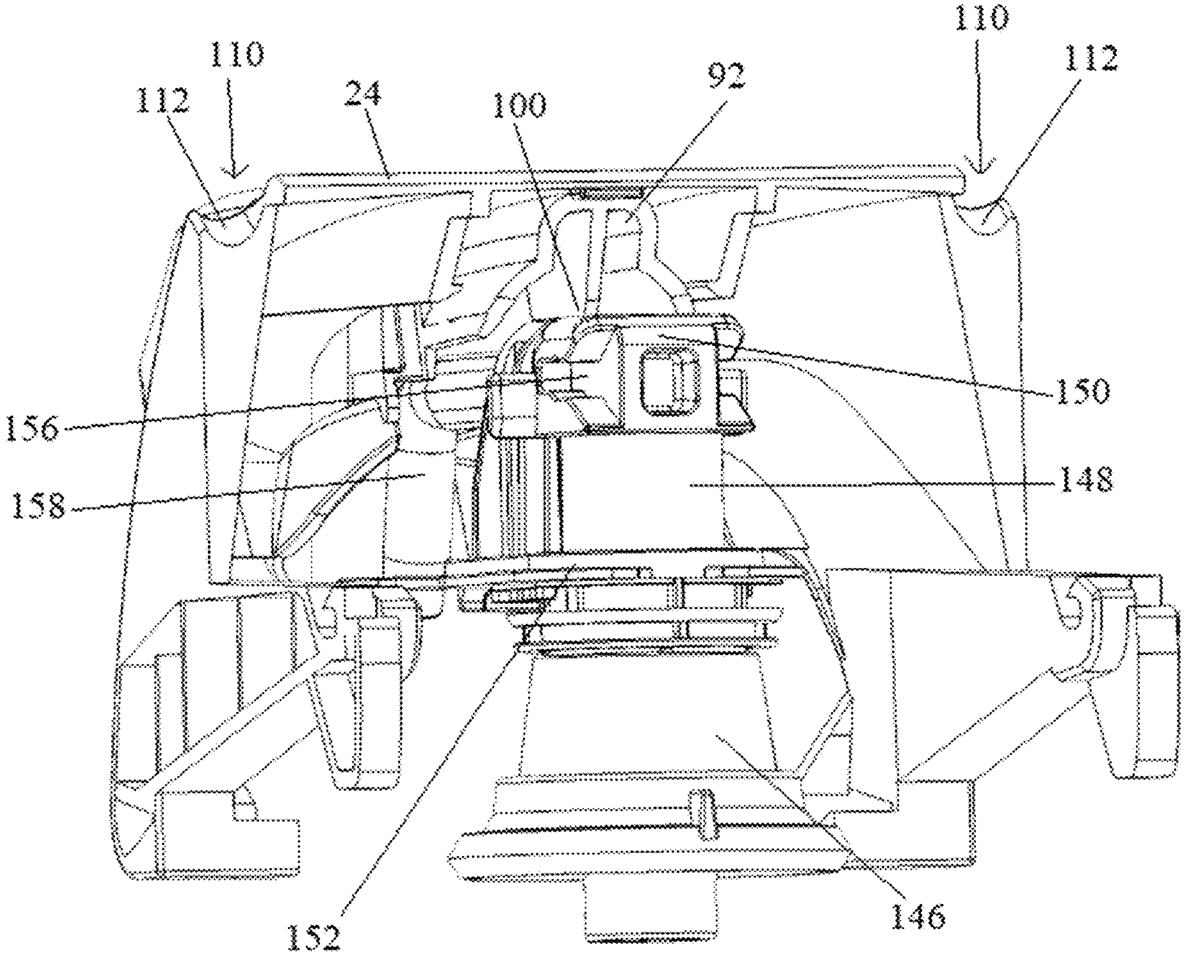
FIG. 16 is a rear perspective view of the nozzle shield of the fluid dispenser housing shown in FIG. 1, together with the mountable fluid dispenser pump shown in FIG. 14, with the dip tube of the mountable fluid dispenser pump omitted.

As can be seen in FIG. 16, when the mountable fluid dispenser 146 is received by the housing 10, the piston head 150 is positioned under the rib 100. When the nozzle shield 24 is at the depressed position and the piston head 150 moves from the second retracted position to the first extended position, the piston head 150 engages with the rib 100, which moves the nozzle shield 24 from the depressed position towards the home position. The engagement between the foot members 34 and the guide surfaces 130, the camming surfaces 122 and the cam surfaces 56, and the force of the spring member 52 also help to guide the nozzle shield 24 back to the home position, as described above.

The applicant has appreciated that the fluid dispenser housing 10 can provide a number of advantages. For example, in at least some embodiments, the fluid dispenser housing 10 is capable of receiving and activating different types of fluid dispensers 134, 146, including both table top fluid dispensers 134 and mountable fluid dispensers 146.

Furthermore, in at least some embodiments, having the lever 18 disengage from the nozzle shield 24 when the lever 18 returns to the rest position under the bias of the biasing mechanism 20 helps to prevent the table top fluid dispenser 134 from falling out of the housing 10.

In addition, the applicant has appreciated that having the lever 18 and the nozzle shield 24 pivot about different axes 62, 132 can provide various benefits. For example, there may be a particular motion for the lever 18 that is preferable, such as from the perspective of user experience or accessibility, and which differs from the preferred motion for the nozzle shield 24, for example from the perspective of effectively activating a table top fluid dispenser 134. Having the lever 18 and the nozzle shield 24 pivot about different axes 62, 132 allows these motions to be selected independently, at least to some extent. In the preferred embodiment that is shown in the drawings, having the nozzle shield pivot axis 132 positioned below the lever axis 62 allows the nozzle shield 24 to more effectively activate the table top fluid dispenser 134 by providing a line of force that is more in line with the movement of the dispensing head 142.

The applicant has also appreciated that having the nozzle shield 24 move forwardly and rearwardly as it moves between the home position and the depressed position can have various advantages. For example, allowing the nozzle shield 24 to move forwardly and rearwardly can help the nozzle shield 24 remain in alignment with the dispensing head 142 of the table top fluid dispenser 134 as the dispensing head 142 moves between the extended and retracted positions.

Optionally, the nozzle shield 24 could incorporate a lip that extends upwardly from the top wall 84, adjacent to the top 26 of the housing body 12. This lip could be provided to cover the gap between the nozzle shield 24 and the housing body 12, for example to prevent a user's fingers from getting pinched between the nozzle shield 24 and the housing body 12. Having the nozzle shield 24 move forwardly as the nozzle shield 24 pivots from the home position may be helpful in preventing the lip from catching on the housing body 12 and interfering with the movement of the nozzle shield 24.

The forwards and rearwards movement of the nozzle shield 24 could also optionally be sensed by a sensor in order to detect when the dispenser 134, 146 has been activated, for example for hand hygiene compliance monitoring or usage monitoring.

The nozzle shield 24 is preferably removable from the housing chassis 14. In the preferred embodiment shown in the drawings, the nozzle shield 24 can be removed from the housing chassis 14 by sliding the axle member 50 out of the hook channel 118. This allows the nozzle shield 24 to be replaced, for example to add a different nozzle shield 24 having a different range of motion or different functionalities.

In some embodiments of the invention, the nozzle shield 24 may be provided separately from the other components of the housing 10. The nozzle shield 24 may, for example, be provided separately in order to allow for retrofitting of pre-existing dispenser housings 10. The nozzle shield 24 preferably has a shape that is selected to complement existing dispenser housings 10, including for example the shape and position of the shoulder cavities 110 being selected to engage with the lever 18 of a pre-existing housing 10; the shape and position of the hook members 114 being selected to engage with the axle member 50 of a pre-existing housing 10; and the shape and position of the camming members 122 being selected to engage with the housing chassis 14 of a pre-existing housing 10. To attach the nozzle shield 24 to a pre-existing housing chassis 14, the axle member 50 of the housing chassis 14 is inserted into the hook channels 118 of the arms 106, 108 of the nozzle shield 24.

It will be understood that, although various features of the invention have been described with respect to one or another of the embodiments of the invention, the various features and embodiments of the invention may be combined or used in conjunction with other features and embodiments of the invention as described and illustrated herein.

The invention is not limited to the particular structures of the preferred embodiments that have been shown in the drawings. Rather, any functionally equivalent structures could be used. For example, the housing body 12, the housing chassis 14, the support member 16, the lever 18, the biasing mechanism 20, the catch mechanism 22, and the nozzle shield 24 could each have a different size, shape, and structure from that shown in the drawings.

In the embodiment shown in the drawings, the nozzle shield 24 acts as a pump engagement member 162 that engages with a dispensing head 142 of the table top fluid dispenser 134 in order to hold the table top fluid dispenser 134 in the housing 10 and to activate the table top fluid dispenser 134 when the lever 18 is depressed. In other embodiments of the invention, the pump engagement member 162 need not be in the form of a nozzle shield 24. For example, the pump engagement member 162 could be provided as a separate component or adapter for engaging with the table top fluid dispenser 134.

The table top fluid dispenser 134 and the mountable fluid dispenser 146 could have any suitable structures, and are not limited to the examples shown in the drawings. In preferred embodiments of the invention, the housing 10 is capable of receiving both table top fluid dispensers 134 and mountable fluid dispensers 146, but this is not strictly necessary. The housing 10 could, for example, be adapted to dispense fluid from only table top fluid dispensers 134 or from only mountable fluid dispensers 146.

The housing 10 and/or the fluid dispensers 134, 146 could incorporate one or more of the features disclosed in U.S. Pat. No. 7,748,573 to Anhuf et al., issued Jul. 6, 2010; U.S. Pat. No. 5,975,360 to Ophardt, issued Nov. 2, 1999; U.S. Pat. No. 7,984,825 to Ophardt et al., issued Jul. 26, 2011; U.S. Pat. No. 8,397,949 to Ophardt, issued Mar. 19, 2013; U.S. Pat. No. 9,027,788 to Ophardt et al., issued May 12, 2015; U.S. Pat. No. 8,622,243 to Ophardt et al., issued Jan. 7, 2014; U.S. Pat. No. 8,733,596 to Ophardt et al., issued May 27, 2004; U.S. Pat. No. 7,455,197 to Ophardt, issued Nov. 25, 2008; U.S. Pat. No. 8,245,877 to Ophardt, issued Aug. 21, 2012; U.S. Pat. No. 8,113,388 to Ophardt et al., issued Feb. 14, 2012; U.S. Pat. No. 8,091,739 to Ophardt et al., issued Jan. 10, 2012; U.S. Pat. No. 8,684,236 to Ophardt, issued Apr. 1, 2014; U.S. Pat. No. 5,373,970 to Ophardt, issued Dec. 20, 1994; U.S. Pat. No. 5,836,482 to Ophardt et al., issued Nov. 17, 1998; U.S. Pat. No. 9,682,390 to Ophardt et al., issued Jun. 20, 2017; U.S. Pat. No. 10,242,301 to Ophardt et al., issued Mar. 26, 2019; U.S. Pat. No. 8,413,852 to Ophardt et al., issued Apr. 9, 2013; U.S. Pat. No. 8,113,388 to Ophardt et al., issued Feb. 14, 2012; and U.S. Pat. No. 7,455,197 to Ophardt, issued Nov. 25, 2008, which are incorporated herein by reference.

The fluid dispensers 134, 146 can be used to dispense hand cleaning fluids, such as soap or hand sanitizer. The fluid dispensers 134, 146 could also be used to dispense any other desired fluid, such as shampoo, body wash, or moisturizer. The term "fluid" as used herein is intended to refer broadly to any flowable substance, including liquids, gels, foams, emulsions, and dispersions.

The dispensing head 142 is also referred to herein as the actuation member 142. The rib 100 serves as a piston engagement surface 164. The piston engagement surface 164 need not be in the form of a rib 100, and any suitable alternative structure could be used. The nozzle shield pivot axis 132 is also referred to herein as the member axis 132. The spring member 52 is also referred to herein as the biasing member 52. The fluid pump 140 of the table top fluid dispenser 134, and the mountable pump 148 of the mountable fluid dispenser 146 are examples of pump mechanisms 166. Any suitable pump mechanisms 166 could be used, and the invention is not limited to the particular examples that are shown in the drawings. The hook member 114 is also referred to herein as a pivot member 114, and the arms 106, 108 of the nozzle shield 24 are also referred to herein as arm members 106, 108.

The engagement between the lever 18 and the shoulder cavities 110 is also referred to herein as a one-way engagement connection 168. The one-way engagement connection 168 transmits force from the lever 18 to the nozzle shield 24 when the lever 18 moves from the rest position to the activated position, which moves the nozzle shield 24 from the home position to the depressed position. The one-way engagement connection 168 is configured so that, when the lever 18 returns to the rest position under the bias of the biasing mechanism 20, no force is applied to the nozzle shield 24 via the one-way engagement connection 168. The invention is not limited to the particular structure of the one-way engagement connection 168 that is shown in the drawings. Rather, any suitable structure could be used that applies force to the nozzle shield 24 when the lever 18 moves from the rest position to the activated position, and does not apply force to the nozzle shield 24 when the lever 18 moves from the activated position to the rest position.

Although this disclosure has described and illustrated certain preferred embodiments of the invention, it is to be understood that the invention is not restricted to these particular embodiments. Rather, the invention includes all embodiments which are functional or mechanical equivalents of the specific embodiments and features that have been described and illustrated herein.

We claim:

1. A fluid dispenser housing comprising:

a lever that is moveable between a rest position and an activated position;

a biasing mechanism that biases the lever towards the rest position; and a pump engagement member that is moveable between a home position and a depressed position;

wherein the lever and the pump engagement member are configured to have a one-way engagement connection;

wherein the one-way engagement connection is configured so that:

when the lever is at the rest position and the pump engagement member is at the home position, movement of the lever from the rest position to the activated position applies an activation force to the pump engagement member via the one-way engagement connection, which moves the pump engagement member from the home position to the depressed position; and when the lever returns from the activated position to the rest position under the bias of the biasing mechanism, no force that would return the pump engagement member from the depressed position to the home position is applied to the pump engagement member via the one-way engagement connection;

wherein the fluid dispenser housing is configured to receive a fluid dispenser;

wherein, when the fluid dispenser is absent from the fluid dispenser housing, the lever is at the rest position, the pump engagement member is at the home position, and the lever moves from the rest position to the activated position, the lever engages with the pump engagement member, which moves the pump engagement member from the home position to the depressed position; and wherein, when the fluid dispenser is absent from the fluid dispenser housing, and the lever returns to the rest position from the activated position under the bias of the biasing mechanism, the lever disengages from the pump engagement member.

2. The fluid dispenser housing according to claim 1, further comprising a support member;

wherein the fluid dispenser housing is configured to receive as the fluid dispenser a table top fluid dispenser;

wherein, when the table top fluid dispenser is received by the fluid dispenser housing, the support member supports a bottom surface of the table top fluid dispenser, and the pump engagement member engages with an actuation member of the table top fluid dispenser;

wherein, when the table top fluid dispenser is received by the fluid dispenser housing and the pump engagement member moves from the home position to the depressed position, the pump engagement member moves the actuation member from an extended position to a retracted position; and wherein, when the table top fluid dispenser is received by the fluid dispenser housing, the pump engagement member is at the depressed position, and the actuation member is at the retracted position, movement of the actuation member from the retracted position to the extended position moves the pump engagement member from the depressed position towards the home position.

3. The fluid dispenser housing according to claim 2, further comprising a catch mechanism that is mechanically connected to the lever;

wherein the catch mechanism moves from a raised position to a lowered position on movement of the lever from the rest position to the activated position, and moves from the lowered position to the raised position on movement of the lever from the activated position to the rest position;

wherein the fluid dispenser housing is configured to receive a mountable fluid dispenser having a piston head with a catch member;

wherein the catch mechanism is configured to engage with the catch member when the mountable fluid dispenser is received by the fluid dispenser housing; and wherein, when the catch mechanism is engaged with the catch member, movement of the catch mechanism from the raised position to the lowered position moves the piston head from a first position to a second position, and movement of the catch mechanism from the lowered position to the raised position moves the piston head from the second position to the first position.

4. The fluid dispenser housing according to claim 3, wherein the pump engagement member has a piston engagement surface;

wherein, when the pump engagement member is at the depressed position, the mountable fluid dispenser is received by the fluid dispenser housing, and the piston head is at the second position, movement of the piston head from the second position to the first position causes the piston head to engage with the piston engagement surface, which moves the pump engagement member from the depressed position towards the home position.

5. The fluid dispenser housing according to claim 4, wherein the piston engagement surface is configured to engage with an elongated nozzle of the piston head; and wherein the piston engagement surface comprises a rib.

6. The fluid dispenser housing according to claim 1, wherein the pump engagement member comprises a nozzle shield.

7. The fluid dispenser housing according to claim 1, wherein the movement of the lever between the rest position and the activated position comprises a pivoting movement of the lever about a lever pivot axis; and wherein the movement of the pump engagement member between the home position and the depressed position comprises a pivoting movement of the pump engagement member about a member pivot axis.

8. The fluid dispenser housing according to claim 7, wherein the lever pivot axis is spaced from the member pivot axis.

9. The fluid dispenser housing according to claim 8, wherein the lever pivot axis is parallel to the member pivot axis.

10. The fluid dispenser housing according to claim 9, wherein the lever pivot axis is above the member pivot axis.

11. The fluid dispenser housing according to claim 7, further comprising an axle member that extends along the member pivot axis;

wherein the pump engagement member comprises a hook member that removably engages with the axle member; and wherein, when the pump engagement member moves between the home position and the depressed position, the hook member pivots about the axle member.

12. The fluid dispenser housing according to claim 11, further comprising a housing chassis and a biasing member;

wherein the axle member is moveable relative to the housing chassis between a forward position and a rear position; and wherein the biasing member biases the axle member towards the rear position.

13. The fluid dispenser housing according to claim 12, wherein the housing chassis comprises a cam surface and the pump engagement member comprises a camming surface;

wherein, when the pump engagement member is at the home position, the cam surface engages with the camming surface and the axle member is at the rear position;

wherein, when the pump engagement member moves from the home position towards the depressed position, the engagement of the cam surface with the camming surface forces the hook member to move forwardly relative to the housing chassis, which moves the axle member forwardly towards the forward position against the bias of the biasing member; and wherein, when the pump engagement member moves from the depressed position towards the home position, the biasing member moves the axle member rearwardly towards the rear position, and the engagement of the cam surface with the camming surface guides the pump engagement member towards the home position.

14. The fluid dispenser housing according to claim 13, wherein, when the pump engagement member is at the home position, the engagement of the cam surface with the camming surface under the bias of the biasing member prevents a force of gravity acting on the pump engagement member from moving the pump engagement member from the home position to the depressed position.

15. The fluid dispenser housing according to claim 14, wherein the housing chassis comprises a foot member;

wherein the pump engagement member comprises a guide surface;

wherein, when the pump engagement member is moved from the depressed position towards the home position, the guide surface moves upwardly into engagement with the foot member; and wherein the engagement between the foot member and the guide surface guides the pump engagement member towards the home position.

16. The fluid dispenser housing according to claim 15, wherein the guide surface is angled so as to face upwardly and forwardly.

17. A fluid dispenser housing comprising:

a lever that is moveable between a rest position and an activated position;

a biasing mechanism that biases the lever towards the rest position; and a pump engagement member that is moveable between a home position and a depressed position;

wherein, when the lever is at the rest position and the pump engagement member is at the home position, movement of the lever from the rest position to the activated position causes the lever to engage with the pump engagement member, which moves the pump engagement member from the home position to the depressed position; and wherein, when the lever returns to the rest position from the activated position under the bias of the biasing mechanism, the lever disengages from the pump engagement member.

18. A fluid dispenser housing comprising:

a lever that is moveable between a rest position and an activated position;

a biasing mechanism that biases the lever towards the rest position; and a pump engagement member that is moveable between a home position and a depressed position;

wherein the fluid dispenser housing is configured to receive a fluid dispenser;

wherein, when the fluid dispenser is absent from the fluid dispenser housing, the lever is at the rest position, the pump engagement member is at the home position, and the lever moves from the rest position to the activated position, the lever engages with the pump engagement member, which moves the pump engagement member from the home position to the depressed position; and wherein, when the fluid dispenser is absent from the fluid dispenser housing, and the lever returns to the rest position from the activated position under the bias of the biasing mechanism, the lever disengages from the pump engagement member.

* * * * *